US012129045B2

(12) United States Patent
Jensen et al.

(10) Patent No.: US 12,129,045 B2
(45) Date of Patent: Oct. 29, 2024

(54) SPARGING EVAPORATOR WITH POROUS MEDIA FOR FUEL ENRICHMENT IN CATALYTIC INERTING SYSTEM

(71) Applicant: PARKER-HANNIFIN CORPORATION, Cleveland, OH (US)

(72) Inventors: Bryan D. Jensen, Mission Viejo, CA (US); Daniel C. Massie, Mission Viejo, CA (US); Daniel J. Henninger, Irvine, CA (US); Scott P. Auld-Hill, Orange, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 494 days.

(21) Appl. No.: 17/609,937

(22) PCT Filed: Jun. 22, 2020

(86) PCT No.: PCT/US2020/038901
§ 371 (c)(1),
(2) Date: Nov. 9, 2021

(87) PCT Pub. No.: WO2021/011152
PCT Pub. Date: Jan. 21, 2021

(65) Prior Publication Data
US 2022/0204177 A1     Jun. 30, 2022

Related U.S. Application Data

(60) Provisional application No. 62/875,653, filed on Jul. 18, 2019.

(51) Int. Cl.
*B64D 37/32*     (2006.01)
*A62C 3/06*     (2006.01)
(Continued)

(52) U.S. Cl.
CPC .............. *B64D 37/32* (2013.01); *A62C 3/065* (2013.01); *A62C 3/08* (2013.01); *A62C 99/0018* (2013.01); *B64D 37/34* (2013.01)

(58) Field of Classification Search
CPC ........ B64D 37/32; B64D 37/34; A62C 3/065; A62C 3/08; A62C 99/0018
See application file for complete search history.

(56) References Cited

U.S. PATENT DOCUMENTS 4,381,187 A * 4/1983 Sederquist ............. C10G 11/22
48/212
7,459,081 B2    12/2008 Koenig et al.
(Continued)

FOREIGN PATENT DOCUMENTS

CN    104843188 A    8/2015
CN    107913728 A    4/2018
(Continued)

OTHER PUBLICATIONS

Okada et al., Catalyst Combustion Type Heater, Aug. 27, 1999, JPH11230507A, Whole Document (Year: 1999).*
(Continued)

*Primary Examiner* — Larry L Furdge
(74) *Attorney, Agent, or Firm* — Renner, Otto, Boisselle & Sklar, LLP

(57) ABSTRACT

A sparging evaporator for an inerting system including an outer vessel, an inner vessel within the outer vessel, and a plenum formed between the inner and outer vessels. The outer vessel includes a gas inlet for receiving inlet gas into the plenum, and a liquid inlet for receiving liquid fuel into the plenum. The inlet gas in the plenum generates a gas pressure that is exerted against a free surface of the liquid fuel in the plenum thereby forcing the liquid fuel and the inlet gas through an inlet of the inner vessel. The inner vessel contains a structure that promotes liberation of fuel vapor
(Continued)

from the liquid fuel and enables the inlet gas in the liquid fuel to sparge the fuel vapor in the liquid fuel, thereby forming a fuel-enriched gas mixture that can be fed to a reactor of the inerting system.

32 Claims, 5 Drawing Sheets

(51) Int. Cl.
*A62C 3/08* (2006.01)
*A62C 99/00* (2010.01)
*B64D 37/34* (2006.01)

(56) References Cited

U.S. PATENT DOCUMENTS

| | | |
|---|---|---|
| 7,628,965 B2 | 12/2009 | Johnson et al. |
| 7,694,916 B2 | 4/2010 | Limaye et al. |
| 7,735,670 B2 | 6/2010 | Zaki et al. |
| 7,896,292 B2 | 3/2011 | Limaye et al. |
| 7,905,259 B2 | 3/2011 | Johnson et al. |
| 8,808,428 B2 | 8/2014 | Gupta |
| 8,828,344 B2 | 9/2014 | K-Wlam et al. |
| 9,144,768 B2 | 9/2015 | Tichborne et al. |
| 10,745,145 B2 | 8/2020 | Dardas et al. |
| 2008/0128048 A1 | 6/2008 | Johnson et al. |
| 2008/0199376 A1 | 8/2008 | Limaye et al. |
| 2018/0037334 A1 | 2/2018 | Surawski et al. |
| 2018/0148188 A1 | 5/2018 | Surawski |
| 2018/0148189 A1 | 5/2018 | Surawski |
| 2018/0148190 A1 | 5/2018 | Surawski |
| 2018/0148191 A1 | 5/2018 | Smith et al. |
| 2018/0155047 A1 | 6/2018 | Surawski |
| 2018/0155048 A1 | 6/2018 | Surawski |
| 2018/0155049 A1 | 6/2018 | Smith et al. |
| 2018/0155050 A1 | 6/2018 | Surawski et al. |
| 2018/0222598 A1 | 8/2018 | Surawski |
| 2018/0354644 A1 | 12/2018 | Massie et al. |
| 2019/0002119 A1 | 1/2019 | Jensen et al. |
| 2019/0185174 A1 | 6/2019 | Thibaud |
| 2020/0187961 A1 | 6/2020 | Emerson et al. |

FOREIGN PATENT DOCUMENTS

| | | |
|---|---|---|
| CN | 110065640 A | 7/2019 |
| CN | 110065641 A | 7/2019 |
| CN | 110077604 A | 8/2019 |
| CN | 110077605 A | 8/2019 |
| CN | 110077606 A | 8/2019 |
| CN | 110092001 A | 8/2019 |
| CN | 110092002 A | 8/2019 |
| CN | 110092003 A | 8/2019 |
| DE | 102017103047 A1 | 5/2018 |
| EP | 3279092 A1 | 2/2018 |
| EP | 3360787 A1 | 8/2018 |
| EP | 3360788 A1 | 8/2018 |
| EP | 3360789 A1 | 8/2018 |
| EP | 3360790 A1 | 8/2018 |
| EP | 3360793 A1 | 8/2018 |
| EP | 3501624 A1 | 6/2019 |
| EP | 3501625 A1 | 6/2019 |
| EP | 3360791 B1 | 5/2020 |
| EP | 3360794 B1 | 1/2021 |
| JP | H11230507 A * | 8/1999 |
| KR | 20200089953 A | 7/2020 |
| WO | 2002/28714 A1 | 4/2002 |
| WO | 2007/008730 A2 | 1/2007 |
| WO | 2017/127478 A1 | 7/2017 |
| WO | 2020/096954 A1 | 5/2020 |

OTHER PUBLICATIONS

Rousseau et al., "Aircraft Fuel Tank Inerting by Catalytic Fuel Combustion," Downloaded from SAE International on Nov. 18, 2015.
Manatt, Scott A., "Feasibility Study And Demonstration of Nitrogen Generation for Fuel Tank Inerting," FAA Report, Jun. 1972.
McDonald et al., "Catalytic Reactor For Inerting of Aircraft Fuel Tanks," Air Force Report, Jun. 1972.
Warner et al., "A Fuel Tank Inerting System for Military Aircraft," Air Force Report, Feb. 1971.
Hamilton, MacKenzie L., "Aircraft Fuel Tank Inerting Program," Air Force Report, Jan. 1971.
Wainright, et al., "Generation of Inerting Gases for Aircraft Fuel Tanks by Catalytic Combustion Techniques," Air Force Report, Aug. 1969.
Second Conference on Fuel System Fire Safety, FAA Report of Conference, May 1970.
International Search Report and Written Opinion mailed Sep. 28, 2021 in corresponding International Application No. PCT/US2020/038901.

* cited by examiner

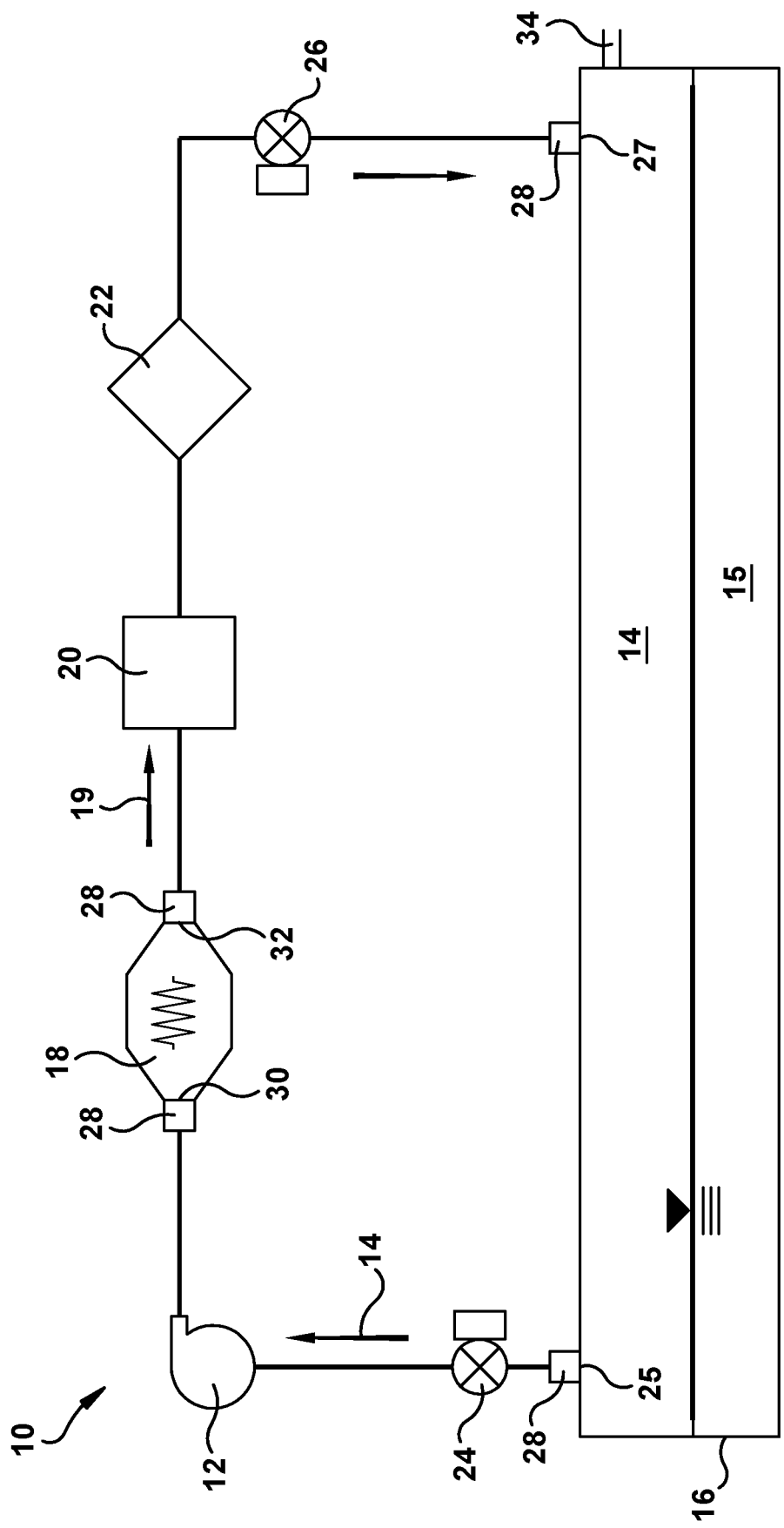
FIG. 1
(CONVENTIONAL)

SPARGING EVAPORATOR WITH POROUS MEDIA FOR FUEL ENRICHMENT IN CATALYTIC INERTING SYSTEM

RELATED APPLICATIONS

This application is a national phase of International Application No. PCT/US2020/038901 filed Jun. 22, 2020, which claims the benefit of U.S. Provisional Application No. 62/875,653 filed Jul. 18, 2019, all of which are hereby incorporated herein by reference in their entireties.

TECHNICAL FIELD

The present disclosure relates generally to inerting systems, more particularly to a catalytic inerting system (CIS) for an aircraft fuel tank, and even more particularly to a sparging evaporator for fuel enrichment in such catalytic inerting system.

BACKGROUND

The basic ullage-recirculating CIS architecture generally requires that ullage gas (the air and fuel vapor mixture that exists over the top of the liquid fuel in a fuel tank) be drawn from the fuel tank and reacted in a catalytic reactor. The catalytic process causes the reactive components present in the ullage gas (i.e., oxygen and fuel vapor) to chemically react and produce relatively inert, non-flammable chemical species, namely carbon dioxide ($CO_2$) and water vapor. Nitrogen, which typically is the component present in the greatest amount in the ullage gas, is an inert species and does not participate in the fuel vapor and air reaction that occurs in the catalytic reactor. The byproducts of the catalytic reaction and the nitrogen are all inert (non-flammable) and can be returned to the fuel tank to create an inert environment in the ullage. Because water is undesirable in the fuel tank, the water typically is removed from the inert gas stream before the gas stream is returned to the fuel tank.

Although the ullage space in the fuel tank will almost always contain fuel vapor in some concentration, this amount is typically below the so-called lower flammability limit (LFL) for tanks containing jet fuel or diesel fuel, and above the upper flammability limit (UFL) for fuel tanks containing gasoline. When the fuel vapor concentration in the ullage space is below the LFL, an insufficient quantity of fuel vapor exists in the ullage space to sustain a fire. When the fuel vapor concentration is above the UFL, the amount of fuel vapor present in the ullage is too great to sustain a fire. Fuels developed for automotive and aircraft applications are typically outside the so-called flammability window defined by the LFL and the UFL.

SUMMARY

The inerting performance of an inerting system is strongly related to the amount of fuel vapor introduced into the reactor for conversion to inert, non-flammable species (e.g., carbon dioxide and water). For example, if the fuel vapor composition is described by the hydrocarbon molecule $C_9H_{18}$, then the reaction equation is:

$$C_9H_{18} + 13.5O_2 \rightarrow 9CO_2 + 9H_2O$$

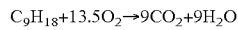

Assuming the reaction is limited by the quantity of fuel vapor molecules, then increasing the number of moles of fuel vapor introduced into the reactor will increase the number of moles of oxygen consumed, and thus increase the production of carbon dioxide and water. Ideally, the reactor would be provided with the maximum amount of fuel vapor while also staying just below the LFL during operation, thereby enabling the reactor to convert the maximum amount of available oxygen into the non-flammable inert byproducts. However, the fuel vapor content in the ullage gas (and therefore that which is introduced into the reactor) strongly depends on the temperature and pressure conditions, such as during flight, and may therefore vary significantly, thus degrading the inerting performance of the system. Accordingly, there is a need in the art to provide an inerting system that can supplement and/or control the fuel vapor content of the reactor's feed gas stream, such as when the ullage fuel vapor content decreases significantly, which may occur during low temperature conditions.

An aspect of the present disclosure provides an inerting system that improves upon the inerting performance of conventional ullage-recirculating inerting systems by providing a sparging evaporator that enriches the fuel vapor content of the reaction gas that is fed to the inerting system reactor.

More particularly, according to an aspect, the sparging evaporator disclosed herein receives a quantity of liquid fuel that is forced by an inlet gas through a sparging vessel in the evaporator, whereby fuel vapor liberated from the liquid fuel is swept away by the inlet gas to form a fuel-enriched gas mixture that is fed downstream to the reactor.

According to a more specific aspect of the present disclosure, a sparging evaporator for a fuel tank inerting system includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet, a liquid outlet, and a gas outlet, wherein the inner vessel inlet is in fluid communication with the plenum; a heater in thermal communication with the liquid fuel, the heater being configured to heat and promote volatilization of at least a portion the liquid fuel to thereby form a volatilized fuel vapor; and a heat-transfer structure at least partially contained within the inner vessel, wherein the liquid fuel and the inlet gas flows through the heat-transfer structure when the evaporator is in use, the heat-transfer structure being in thermal communication with the heater and being configured to promote liberation of the volatilized fuel vapor from the liquid fuel; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet and through the heat-transfer structure, whereby the inlet gas in the liquid fuel sparges the volatilized fuel vapor in the liquid fuel to thereby form a fuel-enriched gas mixture containing the inlet gas and the volatilized fuel vapor, wherein the fuel-enriched gas mixture is carried downstream and exits the sparging evaporator via the gas outlet, and wherein non-volatilized liquid fuel exits the sparging evaporator via the liquid outlet.

According to another aspect, a sparging evaporator includes: a gas stream inlet, a gas plenum and a fuel funnel, through which gas flows; a liquid fuel inlet through which liquid fuel flows into the fuel funnel, and a heater for heating the liquid fuel; a mixing funnel within the fuel funnel, the mixing funnel having a mixing funnel inlet through which the liquid fuel is forced through and into the mixing funnel by the pressure of the gas, wherein gas will bubble up through the liquid fuel in the mixing funnel; a porous medium inside the fuel funnel that transfers heat and promotes mass transfer for liberating fuel vapor from the liquid fuel, wherein a mixture of the fuel vapor and gas from the gas stream inlet exit through a gas outlet as a fuel-enriched gas mixture where it is provided as a process gas to an inerting system; and a fuel window that allows liquid fuel to drain out of the mixing funnel into a fuel outlet passage where it is collected and drained into a fuel outlet line.

According to another aspect, a sparging evaporator includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet and a gas outlet, wherein the inner vessel inlet is in fluid communication with the plenum; and a structure at least partially contained within the inner vessel that is configured to interact with the liquid fuel and the inlet gas; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet to interact with the structure, the structure being configured to promote liberation of fuel vapor from the liquid fuel and enable the inlet gas in the liquid fuel to interact with and sweep away the fuel vapor to thereby form a fuel-enriched gas mixture containing the inlet gas and the fuel vapor, wherein the fuel-enriched gas mixture is carried downstream and exits the sparging evaporator via the gas outlet.

According to another aspect, an inerting system for a fuel tank includes: a fluid circuit fluidly connectable to the fuel tank; a reactor connected in the fluid circuit; and the sparging evaporator according to any of the foregoing aspects that is connected in the fluid circuit upstream of the reactor; wherein the sparging evaporator is configured to receive a flow of the liquid fuel from the fuel tank, and wherein the evaporator is configured to receive at least a portion of flow of the inlet gas from ullage gas in the fuel tank; wherein the reactor is configured to convert at least a portion of the fuel-enriched gas mixture into a non-flammable gas; and wherein the fluid circuit is configured to supply at least a portion of the non-flammable gas to the fuel tank.

According to another aspect, a sparging evaporator includes: a vessel having a gas inlet for ingress of an inlet gas, a liquid inlet for ingress of a liquid fuel, and an outlet; a structure within the vessel having at least one fluid flow passage through which the inlet gas and the liquid fuel flow; wherein the structure is configured to promote liberation of fuel vapors from the liquid fuel, whereby the inlet gas sweeps away the fuel vapors to form a fuel-enriched gas mixture that is carried downstream and exits the vessel through the outlet.

According to another aspect, a method of fuel-vapor enrichment of a process gas stream for an inerting system includes: feeding an inlet gas into a plenum of a sparging evaporator; feeding liquid fuel into the plenum; exerting the inlet gas against a free surface of the liquid fuel in the plenum to force the liquid fuel and the inlet gas into a vessel having a structure that interacts with the liquid fuel, thereby causing fuel vapor to be liberated from the liquid fuel; sparging the fuel vapor with the inlet gas in the vessel to form a fuel-enriched gas mixture; and carrying the fuel-enriched gas mixture downstream through a gas outlet of the sparging evaporator.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a schematic diagram of a conventional ullage-recirculating catalytic inerting system.

DETAILED DESCRIPTION

Figure 2:
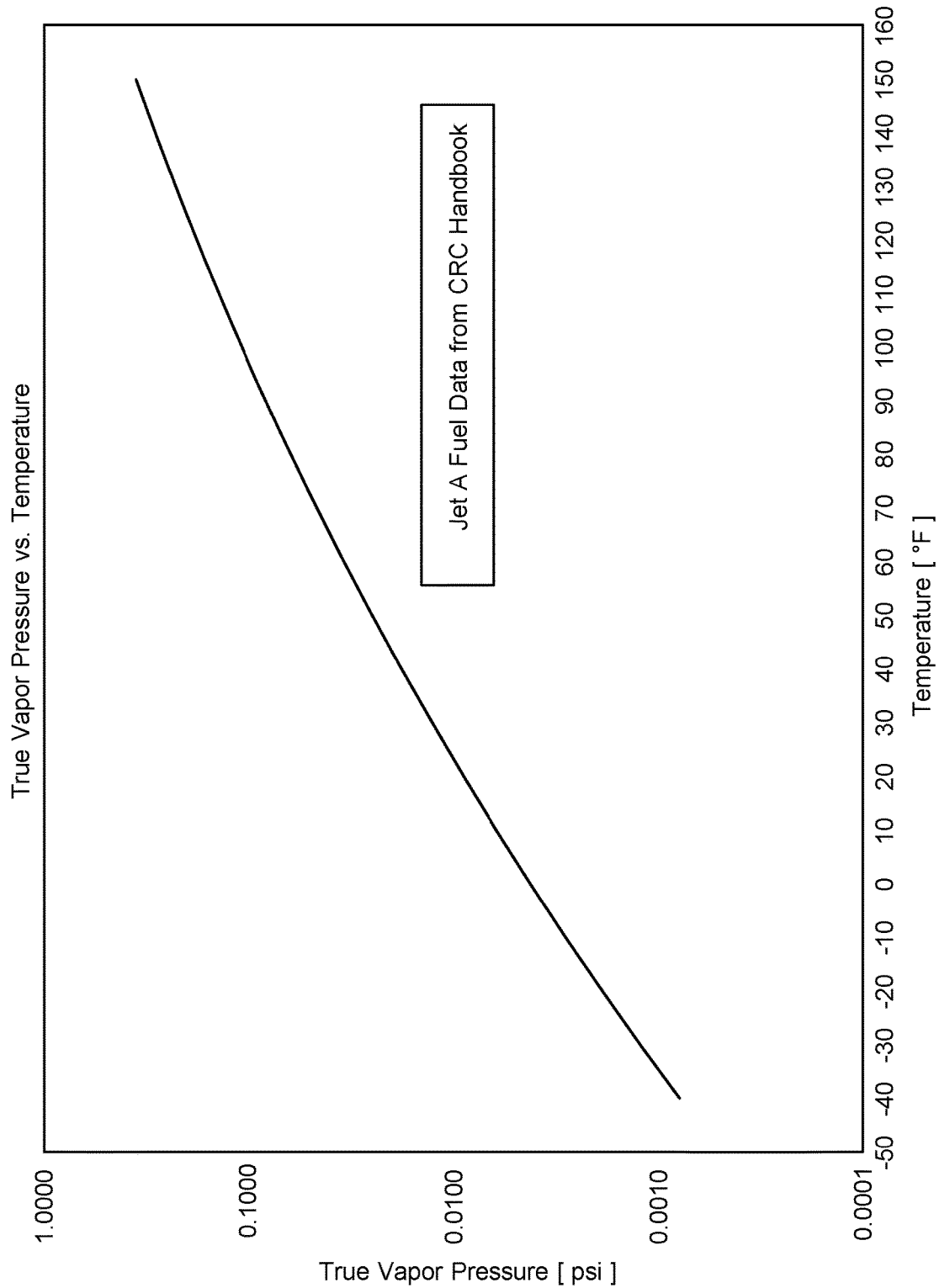
FIG. 2 is a chart plotting the true vapor pressure versus temperature for Jet A fuel.

The principles and aspects according to the present disclosure have particular application to ullage-recirculating catalytic inerting systems (CIS) for fuel tanks, and more specifically to an exemplary sparging evaporator for such systems, and thus will be described below chiefly in this context. It is understood, however, that principles and aspects according to the present disclosure may be applicable to other inerting systems generally, and may be applicable to a wide variety of applications, such as aerospace, automotive, industrial applications, and the like.

Referring to FIG. 1, an example of a conventional ullage-recirculating catalytic inerting system (CIS) 10 is shown. The conventional CIS 10 includes a closed-loop circuit that utilizes a blower 12 to draw ullage gas 14 from a fuel tank 16 into a catalytic reactor 18. The ullage gas 14 includes an air and fuel vapor mixture that exists over the top of the liquid fuel 15 in the fuel tank 16. The catalytic reactor 18 uses a catalytic reaction process that causes the flammable components present in the ullage gas 14 (i.e., oxygen and fuel vapor) to chemically react and produce relatively inert, non-flammable chemical species, namely carbon dioxide ($CO_2$) and water vapor. The ullage gas 14 also contains nitrogen, which typically is the component present in the greatest amount in the ullage gas 14. The nitrogen is inert and does not participate in the fuel vapor and air reaction that occurs in the catalytic reactor 18. The gaseous byproducts of the catalytic reaction and the nitrogen are all inert (non-flammable) and are then returned to the fuel tank 16 to create an inert environment in the ullage. An example of such a conventional CIS 10 is disclosed in U.S. Pat. No. 7,694,916, the contents of which are incorporated herein by reference.

As shown in FIG. 1, the conventional CIS 10 typically includes a heat exchanger 20 that is used to cool the inert (non-flammable) gas 19 exiting the reactor 18, and may include a condenser 22 that is used to condense at least some components of the gas 19, such as the water vapor, for facilitating removal thereof before the non-flammable gas 19 is returned to the fuel tank 16. An isolation valve 24 may be connected to a fluid line downstream of an outlet 25 of the fuel tank 16 to prevent flow of the ullage gas 14 into the CIS 10, and another isolation valve 26 may be connected to a fluid line upstream of an inlet 27 of the fuel tank 16 to prevent flow from the CIS 10 to the fuel tank 16. One or more flame arrestors 28 also may be provided at various locations of the circuit, such as at an inlet 30 and outlet 32 of the reactor 18, and/or at the outlet 25 and inlet 27 of the fuel tank 16. An ambient vent 34 may be provided in the fuel tank 16 to equilibrate pressure when exposed to super-atmospheric or sub-atmospheric conditions.

As discussed above, one problem with conventional catalytic inerting systems, such as the CIS 10 shown in FIG. 1, is that the fuel vapor content in the ullage gas 14 (and therefore that which is introduced into the reactor 18) depends on the temperature and pressure conditions, and therefore may vary significantly such as during flight. For example, the chart in FIG. 2 shows how a jet fuel's true vapor pressure varies with fuel temperature. In some cases, the quantity of fuel vapor (as determined by its vapor pressure) can vary by more than a factor of 10 across normal operating temperatures. Accordingly, because the reaction in the catalytic reactor 18 is strongly related to the amount of fuel vapor molecules contained in the ullage gas 14, the inerting performance of the CIS 10 will be negatively affected when the vapor pressure of the ullage gas stream 14 decreases, such as in low temperature conditions.

Figure 3:
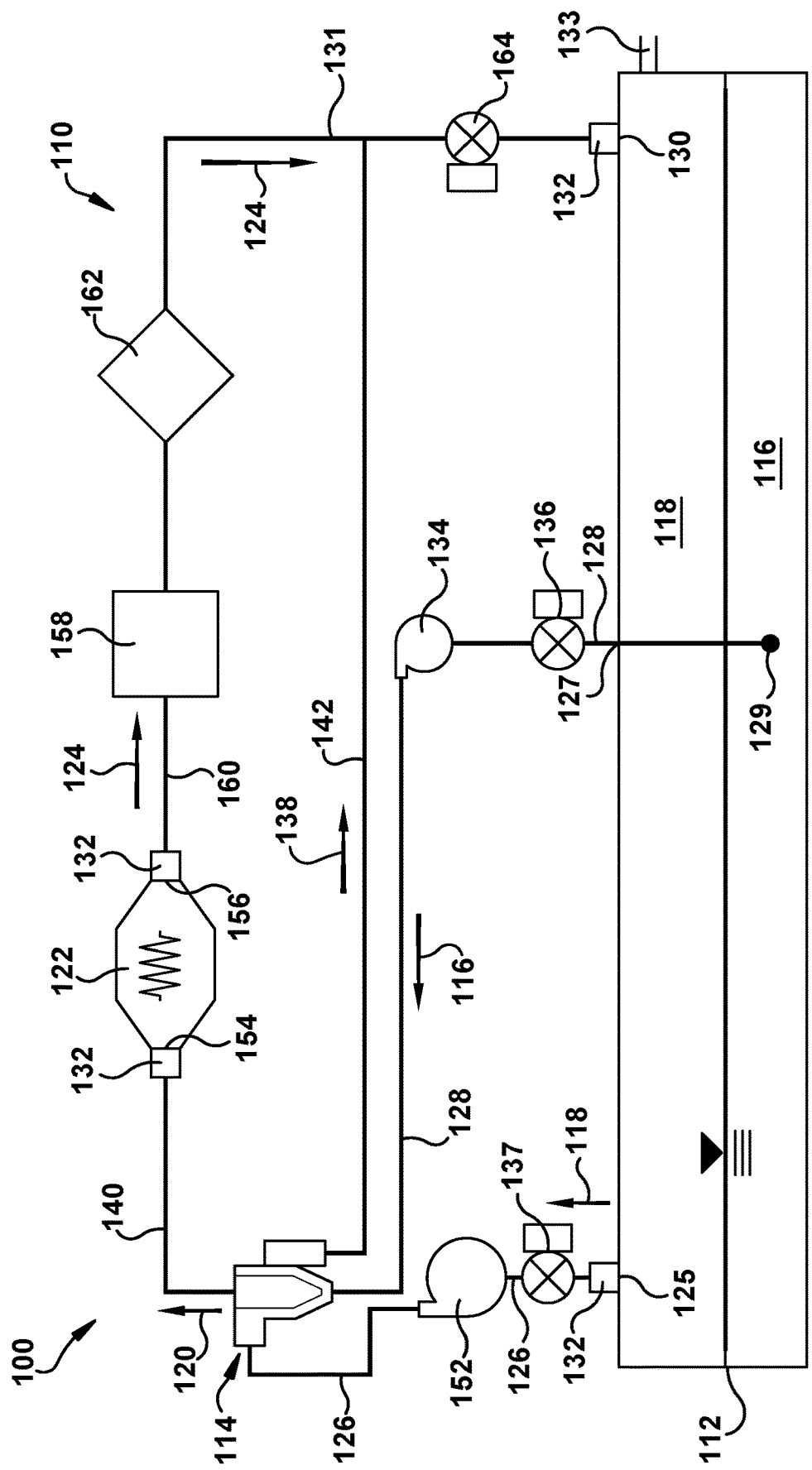
FIG. 3 is a schematic diagram of an exemplary inerting system according to an embodiment of the present disclosure.

FIG. 3 shows an exemplary embodiment of an inerting system 100 according to the present disclosure that improves upon the conventional ullage-recirculating catalytic inerting system 10. According to an aspect of the present disclosure, the inerting system 100 is configured to supplement the ullage gas from a gas tank with a quantity of additional fuel vapor, and this enriched gas mixture is then supplied into a reactor to thereby enhance the conversion of reactive species (e.g., fuel vapor and oxygen) in the gas mixture to inert, non-flammable species (e.g., carbon dioxide) that may then be returned to the fuel tank. The exemplary inerting system 100 may modify conventional inerting systems, such as the CIS 10, to provide such advantageous features; or the inerting system 100 may be specially constructed depending on the requirements of the application, as would be understood by those having ordinary skill in the art.

As shown in the illustrated embodiment, the exemplary inerting system 100 generally includes a fluid circuit 110 that is fluidly connectable to a fuel tank 112 via one or more fluid conduits or passages (shown schematically). An exemplary sparging evaporator 114 is fluidly connected in the fluid circuit 110 for receiving a flow of liquid fuel 116 from the fuel tank 112. The sparging evaporator 114 (also referred to herein as evaporator 114) is configured to volatilize at least a portion of the liquid fuel 116 to thereby form a volatilized fuel vapor. The evaporator 114 also is configured to receive a flow of inlet gas 118, and is configured to permit the inlet gas 118 to sweep away the volatilized fuel vapor downstream with the inlet gas 118 to form a fuel-enriched gas mixture 120 containing the inlet gas 118 and the volatilized fuel vapor. A reactor 122 is fluidly connected in the fluid circuit 110 downstream of the evaporator 114, and is configured to convert at least a portion of the fuel-enriched gas mixture 120 into an inert, non-flammable gas 124. The fluid circuit 110 is configured to supply at least some of the inert, non-flammable gas 124 generated by the reactor 122 to the fuel tank 112.

The fuel tank 112 may be any suitable fuel tank for the particular application. The fuel tank 112 may be a conventional fuel tank, such as the fuel tank 16 in the CIS 10. The fuel tank 112 includes a first outlet 125, such as an outlet port, to which an inlet gas supply conduit 126 of the circuit 110 is fluidly connected for supplying the inlet gas 118 to the evaporator 114. In the illustrated embodiment, the inlet gas 118 includes ullage gas in the head space of the fuel tank 112. In exemplary embodiments, the inlet gas 118 entering the evaporator 114 may contain other gas species, such as air from the ambient environment. The fuel tank 112 also includes a second outlet 127, such as an outlet port, to which a liquid fuel supply conduit 128 is fluidly connected for supplying the liquid fuel 116 to the evaporator 114. As shown, the liquid fuel supply conduit 128 extends toward a bottom of the fuel tank 112 and includes an inlet portion 129 for withdrawing the liquid fuel 116. The fuel tank 112 also includes an inlet 130, such as an inlet port, to which a gas return conduit 131 of the circuit 110 is fluidly connected for supplying the inert, non-flammable gas 124 to the fuel tank 112. Suitable flame arrestors 132 may be provided at the outlet 125 and the inlet 130. Generally, the fuel tank 112 is sealed to contain the ullage gas 118 in the tank. An ambient vent 133 also may be provided in the fuel tank 112 to equilibrate pressure when exposed to super-atmospheric or sub-atmospheric conditions, for example.

A pump 134 may be fluidly connected in the fluid circuit 110 for supplying the liquid fuel 116 to the evaporator 114. In the illustrated embodiment, the pump 134 is located in the liquid fuel supply conduit 128, although other locations are possible. The pump 134 may be any suitable fuel pump for supplying the desired amount of liquid fuel to the evaporator 114. The pump 134 may provide a constant pressure and/or constant flow rate of the liquid fuel; or the pump 134 may provide a variable pressure and/or variable flow rate of the liquid fuel. A controller (not shown) may be operably coupled to the pump 134 for controlling the desired pressure and/or flow rate, for example. Alternatively, the liquid fuel 116 could be gravity fed to the evaporator 114 without a pump 134. As shown, a valve 136, such as an isolation valve or flow control valve, may be provided in the liquid fuel supply conduit 128 downstream of the fuel tank 112 to control or prevent flow of the liquid fuel 116 into the circuit 110.

The evaporator 114 is fluidly connected in the fluid circuit 110 for receiving the liquid fuel 116 and the inlet gas 118. In the illustrated embodiment, for example, the evaporator 114 is fluidly connected to the liquid fuel supply conduit 128 and the inlet gas supply conduit 126. As shown, a valve 137, such as an isolation valve or flow control valve, may be provided in the inlet gas supply conduit 126 downstream of the fuel tank 112 to control or prevent flow of the inlet gas 118 into the circuit 110. As mentioned above, the evaporator 114 is configured to receive a flow of the inlet gas 118 and a flow of the liquid fuel 116, and is configured to liberate, or volatilize, fuel vapor from the liquid fuel 116 to permit the inlet gas 118 to sweep away the liberated or volatilized fuel vapor downstream with the inlet gas 118 as the fuel-enriched gas mixture. As shown, the evaporator 114 is fluidly connected to a reactor supply conduit 140 downstream of the evaporator 114 and upstream of the reactor 122 for supplying the fuel-enriched gas mixture 120 to the reactor 122. In exemplary embodiments, the unevaporated or non-volatilized liquid fuel 138 is permitted to return to the fuel tank 112 via a liquid fuel return passage 142, which in the illustrated embodiment is fluidly connected to the gas return conduit 131. Further details of the exemplary sparging evaporator 114 are described below in connection with FIGS. 4 and 5.

In the illustrated embodiment, the system 100 includes a blower 152 fluidly connected in the fluid circuit 110 for moving the fuel-enriched gas mixture 120 downstream toward the reactor 122. The blower 152 also may move the inlet gas 118 from the fuel tank 112 to the evaporator 114. The blower 152 may be any suitable blower for moving the gas(es) in the fluid circuit 110. For example, the blower 152 may be a conventional blower, such as the blower 12 in the CIS 10. The blower 152 may be located at any suitable position in the fluid circuit 110 for providing a suction force and/or a blowing force of the gases in the circuit 110. For example, in the illustrated embodiment, the blower 152 is located upstream of the evaporator 114 for drawing the inlet gas 118 out of the fuel tank 112 (and/or ambient environment) and pushing the inlet gas 118 downstream into the evaporator 114.

The reactor 122 is fluidly connected in the fluid circuit 110 downstream of the evaporator 114, and is configured to convert the reactive gas components of the fuel-enriched gas mixture 120 (e.g., oxygen and fuel vapor) into inert, non-flammable gas components (e.g., water and carbon dioxide) in the reacted gas 124. The fuel-enriched gas mixture 120 also may contain nitrogen from the inlet gas 118, which may not participate in the reaction of the reactor 122, and thus may pass through as an inert component in the reacted inert, non-flammable gas 124. In exemplary embodiments, the reactor 122 is a catalytic reactor 122 that causes a catalytic reaction of the fuel-enriched gas mixture 120 for conversion thereof. The catalytic reactor 122 may be a conventional catalytic reactor, such as the reactor 18 in the CIS 10, which may include a heated catalyst bed having catalytic materials that are well-known in the art. Alternatively, the reactor 122 may be another type of reactor, or a reactor specially designed for converting the fuel-enriched gas mixture 120. As shown, flame arrestors 132 may be included on an inlet 154 and outlet 156 of the reactor 122.

A heat exchanger 158 may be fluidly connected in the fluid circuit 110 downstream of the reactor 122 for cooling the reacted inert, non-flammable gas 124. As shown, the heat exchanger 158 is fluidly connected to a reactor exhaust conduit 160 that is connected to the reactor outlet 156. The heat exchanger 158 may be any suitable heat exchanger well-known in the art, such as the heat exchanger 20 in the CIS 10. The heat exchanger 158 may be a plate-fin heat exchanger, for example, having cooling air channels in fluid communication with the outside air.

A condenser 162 may be fluidly connected in the fluid circuit 110 downstream of the heat exchanger 158 for condensing at least some components of the inert, non-flammable gas 124, such as the water vapor. The condenser 162 may be any suitable condenser well-known in the art, such as the condenser 22 in the CIS 10. The condenser 162 may include a drain conduit (not shown) for facilitating removal of the condensed water vapor from the gas 124, thereby preventing water from entering the fuel tank 112.

As shown, a valve 164, such as an isolation valve or flow control valve, may be provided in the return conduit 131 upstream of the fuel tank 112 to prevent flow through the circuit 110. In the illustrated embodiment, the liquid return conduit 142 is connected to the inert, non-flammable gas return conduit 131 upstream of the valve 164. In the system 100, the non-volatilized liquid fuel 138 will flow from the evaporator 114 via the liquid return conduit 142, then flow back into the fuel tank 112 through the valve 164 and gas return conduit 131. The pressure gradient inherent in the system 100 will tend to drive the non-volatilized liquid fuel 138 through the bypass return conduit 142 and into the gas return conduit 131. At this location, the inert, non-flammable gas 124 is flowing down to the ullage space of the tank 112, so the non-volatilized liquid fuel 138 will be urged downstream along with the inert, non-flammable gas 124. Additionally, the system 100 can be completely isolated from the ullage when the isolation valves 137, 164 are closed.

In exemplary embodiments, the inerting system 100 may be substantially the same as or substantially similar to the inerting system 600 shown and described in Applicant's co-pending International Application No. PCT/US2019/59646 filed Nov. 4, 2019, which is incorporated herein by reference in its entirety. It is understood that the exemplary sparging evaporator 114 described herein may be utilized in any of the exemplary inerting systems 100, 200, 300, 400, 500, 600, 700 or 800 described in International Application No. PCT/US2019/59646, as would be understood by those having ordinary skill in the art.

Figure 4:
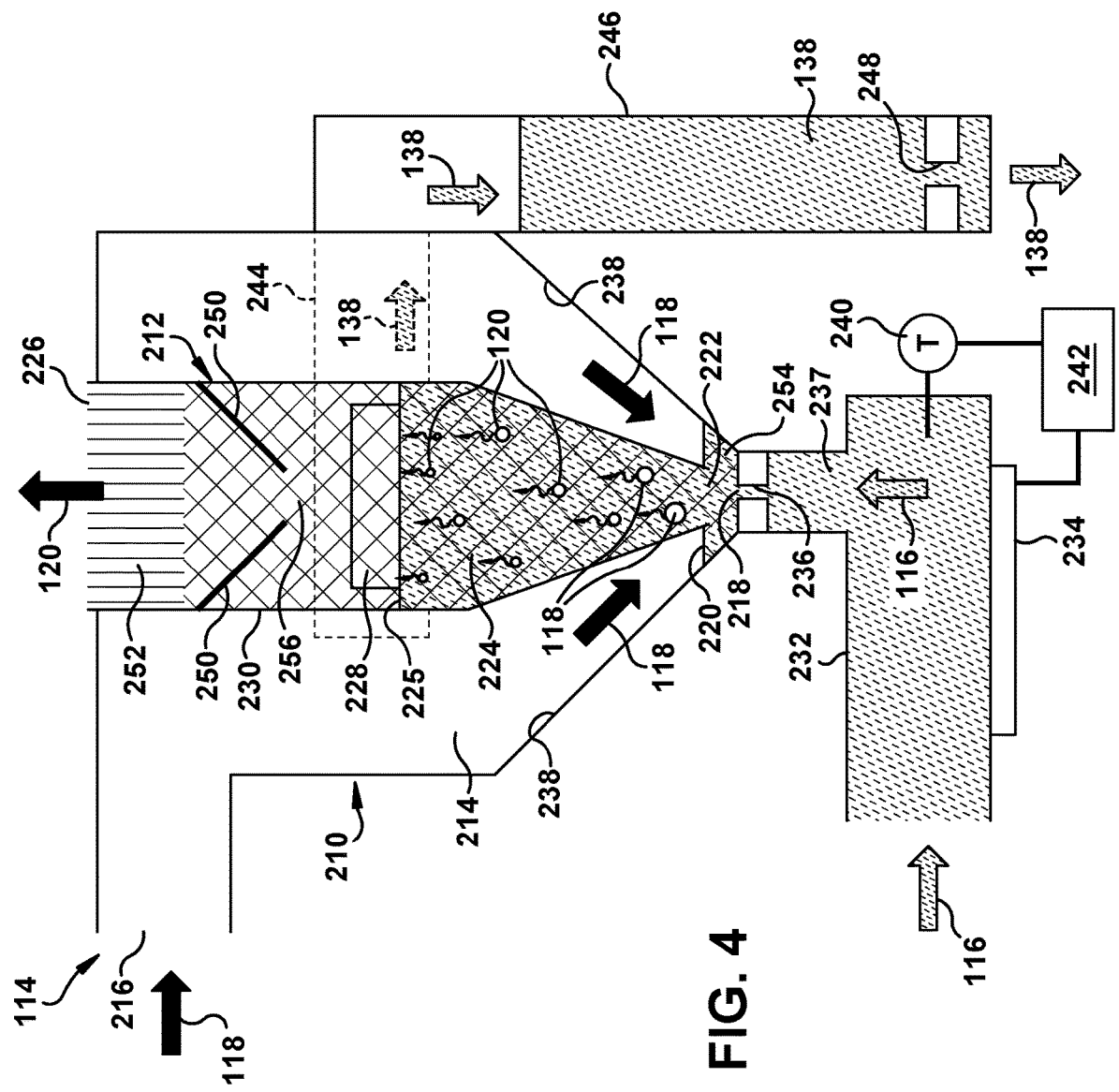
FIG. 4 is a schematic cross-sectional side view of an exemplary sparging evaporator according to an embodiment of the present disclosure that may be used in the inerting system in FIG. 3.

Referring to FIG. 4, an exemplary embodiment of the sparging evaporator 114 is shown. The sparging evaporator 114 generally includes an outer vessel 210, an inner vessel 212 within the outer vessel 210, and a plenum 214 formed between the outer and inner vessels 210, 212. The outer vessel 210 includes a gas inlet 216 for receiving the inlet gas 118 into the plenum 214, and a liquid inlet 218 for receiving liquid fuel 116 into the plenum 214. The inlet gas 118 in the plenum 214 generates a gas pressure that is exerted against a free surface 220 of the liquid fuel 116 in the plenum 214 thereby forcing the liquid fuel 116 and the inlet gas 118 through an inlet 222 of the inner vessel 212. As shown, the inner vessel 212 contains a structure 224 within the inner vessel 212 that is configured to promote liberation of the fuel vapor from the liquid fuel 116, and which enables the inlet gas 118 in the liquid fuel 116 to interact with and sparge the fuel vapor in the liquid fuel 116, thereby forming the fuel-enriched gas mixture 120 containing the inlet gas 118 and the fuel vapor. The fuel-enriched gas mixture 120 is carried downstream and exits the sparging evaporator 114 via a gas outlet 226 of the inner vessel 212. As shown in the illustrated embodiment, the liquid fuel 116 in the inner vessel 212 can be drained via a liquid outlet 228 of the inner vessel 212.

In exemplary embodiments, the gas inlet 216 of the outer vessel 210 is connected to the inlet gas supply conduit 126 of the inerting system 100 to receive the flow of the inlet gas 118. The inlet gas 118 may contain the ullage gas from the fuel tank 112, as shown and described above. Alternatively or additionally, the inlet gas 118 may contain another gas, such as air, which may be drawn from the ambient environment, for example. As shown, the gas inlet 216 may be ported at an upper portion of the outer vessel 210 such that the inlet gas 118 forms a head pressure on the liquid fuel 116. In the illustrated embodiment, an outer surface 230 of the inner vessel 212 forms a barrier, or wall, that defines a portion of the plenum 214 and forces the inlet gas 118 and liquid fuel 116 to enter the inner vessel 212 via the inlet 222 at a lower portion of the inner vessel 212.

In the illustrated embodiment, the liquid inlet 218 is at a lower portion of the outer vessel 210, which facilitates collection of the liquid fuel 116 in the bottom portion of the plenum 214 and facilitates drainage of the liquid fuel 116 when the sparging evaporator 114 is not in use. As shown, the liquid inlet 218 may be fluidly connected to a fuel feed passage 232, such as a channel or rail, which may be used in exemplary embodiments to preheat the liquid fuel 116 with a heater 234 prior to entering the plenum 214, as described in further detail below. In exemplary embodiments, the fuel feed passage 232 (also referred to as fuel feed channel 232) is fluidly connected to the liquid fuel supply conduit 128 of the inerting system 100 to receive the flow of liquid fuel 116 from the fuel tank 112 as described above. As shown, a flow orifice 236 may be provided in an inlet passage 237 upstream of the liquid inlet 218 to the plenum 214. In the illustrated embodiment, the flow orifice 236 provides a flow metering function to control the amount of liquid fuel 116 entering the plenum 214. In exemplary embodiments, the flow orifice 236 is a fixed restriction orifice that provides passive metering of flow into the plenum 214. In alternative embodiments, the flow orifice 236 may be actively controlled via a suitable valve to control flow. In some embodiments, the pump 134 of the inerting system 100 is a positive displacement fuel pump that is adjustable to provide the desired flow rate of liquid fuel 116 to the evaporator 114, although other suitable pumps may be employed.

As shown in the illustrated embodiment, each of the outer vessel 210 and inner vessel 212 is configured with a funnel shape, such as a cone, that promotes collection of the liquid fuel 116 toward a bottom portion of the respective vessels 210, 212. Because the inner vessel inlet 222 is located proximate to the bottom portion of the funnel shape of the outer vessel 210, any changes in the relative angle between the free surface 220 and the inlet to the inner vessel 222 due to the inertia loads imposed by flight maneuvers of the aircraft will still allow the liquid fuel 116 to collect around the inner vessel inlet 222 due to the tapered walls 238 of the outer vessel 210. The funnel shape of the respective outer and inner vessels 210, 212 also permits the liquid fuel 116 to drain back through the fuel feed channel 232 when the evaporator 114 is not in use to prevent fuel from accumulating in the evaporator 114.

As discussed briefly above, when the evaporator 114 is in use, the inlet gas 118 entering the plenum 214 via the gas inlet 216 generates a gas pressure within the plenum 214 that is exerted against the free surface 220 of the liquid fuel 116 in the plenum 214. The gas pressure exerted against the free surface 220 is greater than the hydrostatic pressure of the liquid fuel 116 at the free surface 220 that has passed through the flow control orifice 236, such as via the pump 134. Accordingly, the inlet gas 118 in the plenum 214 pushes the level of the free surface 220 downwardly in the plenum 214, which causes the liquid fuel 116 to be forced upwardly into the inner vessel 212 via the inlet 222. As shown, the level of the free surface 220 of the liquid fuel 116 is pushed downwardly until it becomes nearly level with the inner vessel inlet 222. The gas pressure will continue to push the free surface level of the liquid fuel 116 down slightly below the inner vessel inlet 222 until the inlet gas 118 can escape through the inlet 222 and bubble up through the liquid fuel 116 contained in the inner vessel 212. Such inlet gas 118 bubbling up through the inner vessel 212 will interact with the fuel vapor liberated from the liquid fuel 116 in the inner vessel 212, such that the inlet gas 118 sweeps the fuel vapor downstream toward the gas outlet 226 as the fuel-enriched gas mixture 120 containing the inlet gas 118 and fuel vapor.

In exemplary embodiments, the fuel vapor will volatilize or evaporate into the gas/air space at a free surface 225 of the liquid fuel 116 in the inner vessel 212, on the surfaces of structures above the free surface 225 in the inner vessel 212 (e.g., structure 256, described below), and/or across the free surface that exists on the bubbles of inlet gas 118 that are flowing through the liquid fuel 116 in the inner vessel 212. In this manner, the fuel vapor is expected to generally liberate from the liquid fuel 116 at the interface between the liquid fuel 116 and a gas (e.g., inlet gas 118 or fuel-enriched gas vapor 120). In this way, the bubbles of inlet gas 118 entering the liquid fuel 116 in the inner vessel 112 initially may contain essentially all inlet gas when entering the inner vessel 112, and this gas will become progressively richer with fuel vapor until the fuel-enriched gas mixture 120 exits the device.

The structure 224 contained within the inner vessel 212 is configured to promote liberation of the fuel vapor from the liquid fuel 116, and is configured to enable the inlet gas 118 in the liquid fuel 116 to interact with and sparge the fuel vapor in the liquid fuel 116 to thereby form the fuel-enriched gas mixture 120. Generally, the structure 224 is located between at least the inlet 222 and the gas outlet 226 of the inner vessel 212, such as between the inlet 222 and liquid outlet 228 to promote sparging within this interaction zone, but may extend to other regions to provide other functionality, as described in further detail below. In exemplary embodiments, the structure 224 is configured to facilitate liberation (e.g., volatilization) of the lower molecular weight components of the liquid fuel 116 to form the fuel vapor, while the higher molecular weight components remain in a liquid state as the non-volatilized liquid fuel 138. Such separation of the volatilized fuel vapors from the non-volatilized liquid fuel 138 may enable separation of contaminants that may affect the performance of the reactor 122. Such contaminants tend to be heavier and less volatile than the lighter ends of the liquid fuel 116 that are volatilized by heating in the evaporator 114. Therefore, the volatilized fuel vapors may inherently contain less contaminants than the unevaporated liquid fuel 138, thereby improving the life of the reactor 122.

The structure 224 may be any suitable structure that promotes the liberation and sparging functionality of the evaporator 114 and/or which facilitates control of fluid flow through the evaporator. For example, the structure 224 may be configured as a mixing structure that agitates the liquid fuel 116 as the liquid fuel is forced through the structure 224. Such a mixing structure also may promote agitation of the bubbles of the inlet gas 118 in the liquid fuel 116, which may reduce bubble size and increase surface area, and may better disperse the bubbles, thereby enhancing the sparging effect. Alternatively or additionally, the structure 224 may be configured as a heat-transfer structure that transfers heat to the liquid fuel 116 to promote liberation of the fuel vapors by volatilization. Such a heat-transfer structure may be in thermal communication with a suitable heater, such as the heater 234, for example. To help facilitate such heat transfer, the structure 224 may be in direct contact with the walls of the inner vessel 212, or may be integrated into the inner vessel 212, and also may be in direct contact with or integrated into the outer vessel 210. Where the structure 224 provides mixing functionality in combination with heat-transfer functionality, such mixing while heating may promote heat transfer and volatilization of the fuel vapors by enhancing the turbulence of the fluid flow. Alternatively or additionally, the structure 224 may be configured as a flow diffuser in which a narrow jet of fluid (e.g., inlet gas 118, liquid fuel 116, and fuel vapor) enters the upstream side of the structure 224 and is widely diffused/expanded in a relatively short distance across the structure 224 to output a uniform flow field at the downstream end of the structure 224.

In exemplary embodiments, the structure 224 is a porous structure, such as a porous medium or substrate, that enables the fuel vapors to be liberated from the liquid fuel 116, and allows the inlet gas 118 passing through the structure at ambient pressure to carry away the fuel vapors. The pores of the structure 224 are the void regions between respective spaced apart portions of the structure 224. The pores of the structure 224 form passages between the respective spaced apart portions of the structure 224. The pores may be holes or openings through a surface of the structure 224, or the pores may be the interstices between respective portions of the structure 224. The overall porosity of the structure 224 is the aggregate volume of all the pores in the structure 224 divided by the overall volume of the structure 224, which is defined in terms of open volume over total volume. In exemplary embodiments, the porous structure has a high surface area for heat transfer and mass transfer (evaporation), and prevents fuel splashing. For example, in exemplary embodiments, the porous structure may have a porosity in the range from 50% to 90% (open volume/total volume), more particularly in the range from 58% to 80% (open volume/total volume), such as 50%, 55%, 60%, 65%, 70%, 75%, 80%, 85% or 90% porosity. In exemplary embodiments, the size of the openings between surfaces of the structure 224 may be in a range from about 0.01 inches to about 0.2 inches, for example, such as 0.01, 0.02, 0.06, 0.1, 0.15, or 0.2 inches, including all ranges and subranges between the stated values. The pores of the structure 224 (i.e., openings between surfaces of the structure 224) may be randomly dispersed or uniformly arranged across the structure 224. In exemplary embodiments, the structure 224 has a network of interconnected (open) pores that form tortuous flow paths for the fluid (e.g., liquid fuel 116, inlet gas 118, and fuel vapor) flowing through the structure 224.

In exemplary embodiments, the porosity of the structure 224 helps to draw the liquid fuel 116 up into the inner vessel 212 through capillary action and wet out the surfaces of the structure 224 that forms the pores. When heated or otherwise volatilized, the fuel vapors are liberated from these pore surfaces, thereby providing a high-degree of fuel vapor generation. The porosity of the structure 224 also may enhance the uniformity of the discharge stream downstream of the structure 224 within a relatively compact distance. For example, the open porosity of the structure 224 may form relatively small and/or tortuous flow paths such that the structure 224 serves as a flow restrictor to the fluid (e.g., liquid fuel 116, inlet gas 118, and fuel vapor) flowing thereacross. This restriction enables a rapid expansion of the fuel-enriched gas mixture 120 in a relatively short distance along the flow path. The fuel-enriched gas mixture 120 that is discharged at the downstream end of the structure 224 has a relatively uniform velocity profile as it exits the evaporator 114 and which can be carried downstream to the reactor 122.

In exemplary embodiments, the structure 224 may be made of any suitable material in any suitable configuration. An exemplary porous structure 224 (e.g., porous medium, porous substrate, bed, or the like) may include one or more of: a matrix of metal wire meshes, such as a stack of wire mesh discs or sheets, which may include interwoven metal wires, in which the pores are the interstitial spaces between the wires; open celled foam or sponge, such as pyrolyzed foam with silicon carbide vapor deposition coating, in which the pores are the openings between the foam surfaces; metal or ceramic particles or beads, or other high surface area to volume shapes, which may form a bed, and in which the pores are the interstitial spaces between the particles; randomly oriented metal fibers, such as stainless-steel wool, in which the pores are the interstitial spaces between the fibers; metal plates or vanes that are randomly or orderly oriented relative to each other to provide a network of pore channels therebetween; and/or designed high surface area geometries that are 3D printed in suitable materials, such as suitable metallic material(s), and which form a pore structure.

The material or combination of materials forming the structure 224 may be high thermal conductivity materials (e.g., greater than about 10 W/m-K, more particularly greater than about 50 W/m-K, or greater than 100 W/m-K. For example, the structure 224 may include or be made from an alloy of aluminum, such as $AlSi_{10}Mg$ having a thermal conductivity in the range from 103 to 190 W/m-K. Alternatively or additionally, other materials suited to high temperature applications, such as stainless steel or Inconel, could be employed, which may require a higher heat flux from the heat source. It is understood that these examples are not intended to be limiting, and the structure 224 may be made of any suitable material or combination of materials in any suitable configuration as would be understood by those having ordinary skill in the art.

In exemplary embodiments, the evaporator 114 includes one or more energizers that cooperate with the structure 224 to facilitate liberation of the fuel vapors from the liquid fuel 116. The energizer(s) may be any suitable energizer (s) located at any suitable location(s). For example, the energizer may be a suitable heater, such as an electric heater, that is in thermal communication with the structure 224 and provides heat to the liquid fuel to increase the temperature sufficiently to promote liberation (e.g., volatilize) of the fuel vapors, such as the lower molecular weight components of the liquid fuel. Alternatively or additionally, the energizer may include an ultrasonic transducer, for example, such as a mechanical, electromechanical or magnetostrictive transducer. In exemplary embodiments, the ultrasonic transducer is configured to generate ultrasonic vibration with sufficient energy to promote liberation of the fuel vapors, and more particularly is tuned to liberate the low molecular weight components of the liquid fuel into a vapor state while the heavier components of the fuel remain in the liquid state.

In the illustrated embodiment, the electric heater 234 is used as the energizer, which provides a simple and reliable way for facilitating or causing volatilization of the fuel vapors. As shown in the illustrated embodiment, for example, the heater 234 is connected to the fuel feed channel 232 which preheats the liquid fuel 116 prior to entering the plenum 214. The heat from the heater 234 is transferred via the walls and other structures of the evaporator 114 to the structure 224, which provides sufficient heat to the liquid fuel 116 in contact with the surfaces of the structure 224 to raise the temperature of the liquid fuel 116 and facilitate liberation of the fuel vapors. In exemplary embodiments, the temperature of the liquid fuel 116 is below the temperature at which the onset of boiling occurs for the liquid fuel, and thus there is no anticipation that bubbles of fuel vapor (without inlet gas) will form in the device. As shown, the heater 234 may be operatively coupled to the fuel feed channel 232 because it is easier to control the temperature of the liquid fuel 116 in a bulk single-phase region instead of the multi-phased dispersed region flowing through the structure 224.

In exemplary embodiments, one or more heaters may be provided in thermal communication with the structure 224 via walls of the evaporator 114 or other suitable thermal conduction paths. It is understood that the heater 234 may be located at any other suitable location and may take any other suitable form, or more than one such heater 234 may be employed. For example, one or more heater(s) may include blanket, cartridge or panel heater(s) operatively coupled to the wall(s) of the outer vessel 210 to preheat the inlet gas 118 and the liquid fuel 116 in the plenum 214, for example. Such heater(s) in such suitable location(s) also would be in thermal communication with the structure 224 to promote volatilization of the fuel vapor, as discussed above.

One or more temperature sensors may be provided for measuring temperature at any desired location of the evaporator 114. In the illustrated embodiment, for example, a temperature sensor 240 is provided that measures the temperature of the liquid fuel 116 in the fuel feed channel 232. Alternatively or additionally, one or more temperature sensors may measure the temperature of the structure 224, the fluid through the structure 224, the fuel-enriched gas mixture 120 exiting the structure 224, or any other desired temperature. The sensor(s) 240 and heater 234 may be operably coupled to a controller 242 for controlling the temperature of the liquid fuel 116, the structure 224, the fuel-enriched gas mixture 120, or the like, which thereby controls the amount of fuel vapors contained in the gas mixture 120. Alternatively, the heater 234 may be passively controlled using a positive temperature coefficient (PTC) heater, for example.

In exemplary embodiments, the heater(s) 234 are controlled to provide the desired mole fraction of fuel vapor in the fuel-enriched gas mixture 120 (including volatized fuel vapor and fuel vapor contained in the inlet gas 118) that is introduced into the reactor 122. The fuel vapor mole fraction is equal to partial pressure divided by total pressure, and the partial pressure of the fuel vapor is a function of temperature. Therefore, to control the mole fraction of the fuel vapor introduced into the reactor 122, the temperature of the fuel feed channel 232, the heated structure 224, the liquid fuel 116, and/or the fuel-enriched gas mixture 120 (or the like), may be controlled as a function of local ambient pressure (i.e., altitude). For example, the controller 242 that controls the heater 234 may receive feedback signals from an altitude sensor (not shown) and/or a pressure sensor (not shown), and utilize such feedback (such as with closed-loop logic) to control the heating of the fuel feed channel 232, the structure 224, etc. Such temperature control may be varied during an entire flight profile to account for temperature and/or pressure (i.e., altitude) changes. Such temperature control also may control the degree of volatilization of the liquid fuel 116 into fuel vapors. In exemplary embodiments, the flow rate of the liquid fuel 116 into the evaporator 114 does not need to be controlled, provided a sufficient amount of fuel (e.g., at least a 10:1 mass ratio of liquid-fuel to vapor fuel) is continuously provided to the evaporator 114. Alternatively, the amount of liquid fuel 116 introduced into the evaporator 114 may be controlled, such as via feedback control of the pump 134 via a suitable controller (e.g., controller 242). In general, the resulting fuel-enriched gas mixture 120 of inlet gas 118 and volatilized fuel vapor is controlled to enhance the fuel vapor content of this reaction gas 120, such as slightly below the LFL (e.g., fuel to air equivalence ratio of about 0.5 for Jet A fuel (FIG. 2). This makes the reaction gas 120 inherently non-flammable, while also enhancing the reactor's conversion of the gas mixture 120 to the inert, non-flammable gas 124 in the inerting system 100.

In a non-liming example, a hypothetical set of conditions may be considered. Although numerous researchers have characterized flammability limits in various ways for various fuels, the Federal Aviation Administration (FAA) provides a numerical methodology in which flammability limits may be directly calculated in terms of fuel temperature as a function of altitude when the flash point of the fuel is known (reference 14 CFR Part 25, Appendix N). This methodology is useful in the context of setting a fuel temperature inside the fuel evaporator that is outside the range of the flammability limits. Using the mean flash point defined by the FAA of 120° F., the corresponding LFL at sea level is 10° F. below this value, which in the case of the mean flash point fuel is 110° F. The FAA also defines an LFL reduction as a function of altitude of 1° F. per every 808 feet above sea level. If an operating altitude of 10,000 feet above sea level is considered in this example, the LFL would then be 97.6° F. This result provides useful guidance for setting the operating temperature of the evaporator 114 as a function of altitude. For example, FIG. 2 suggests that the true vapor pressure of the Jet A fuel at this temperature would be approximately 0.102 psi. At 10,000 ft this partial pressure of fuel vapor would correspond to a mole fraction of fuel of approximately 0.7%. It may be desirable to operate the fuel evaporator 114 at a discharge mole fraction below this value. For this non-limiting example, a value of 0.5% fuel vapor by volume is used. Further assuming a nominal ullage gas flow rate into the fuel evaporator of 1 liter per second, the discharge fuel vapor mass flow rate would be approximately 1 g/min. Assuming that 10% of the liquid fuel 116 entering the fuel evaporator 114 is volatilized and carried away in the discharge stream 120, a liquid fuel flow rate 10X greater than the discharge fuel vapor flow rate may be desired. In the hypothetical case, a liquid fuel 116 flow rate of 10 g/min is desired, which implies that 9 g/min of non-volatilized liquid fuel 138 is returned to the fuel tank 112. It is understood that the foregoing is merely exemplary, and other suitable flow rates and/or quantities of the liquid fuel 116 may be introduced into the evaporator 114 as may be desired depending on the application or operational conditions, which would be understood by those having ordinary skill in the art.

Still referring to FIG. 4, as the liquid fuel 116 is pushed up through the structure 224 in the inner vessel 212 (by the inlet gas 118 pressure exerted against the free surface 220 of the liquid fuel 116 in the plenum 214), the liquid fuel 116 will reach the liquid outlet 228 of the inner vessel 212 enabling the non-volatilized portion 138 of the liquid fuel to drain from the evaporator 114. As shown, the liquid outlet 228 may be configured as a window through a wall of the inner vessel 212 that is fluidly connected to a fuel outlet passage 244, such as a fluid channel or gutter, that is fluidly connected to a fuel discharge line 246. The non-volatilized liquid fuel 138 drains through the liquid outlet 228 into the fuel outlet passage 244 and out of the discharge line 246. In exemplary embodiments, the fuel discharge line 246 is fluidly connected to the liquid fuel return passage 142 of the inerting system 100 for returning the non-volatilized fuel 138 to the fuel tank 112. As shown in the illustrated embodiment, the fuel discharge line 246 may include a flow restriction orifice 248, such as a fixed restriction metering orifice, that meters the non-volatilized liquid fuel flow rate in a manner that maintains a non-zero liquid fuel head above the flow restriction orifice 248. This prevents any fuel-enriched gas mixture 120 that has escaped through the liquid outlet 228 from exiting through the fuel discharge line 246 by being contained above the liquid fuel head. The pressure from the fuel head and positive pressure from any gas stream within the fuel outlet passage 244 will tend to push non-volatilized liquid fuel 138 through the flow restriction orifice 248 and through the fuel discharge line 246, where the non-volatilized liquid fuel 138 can be returned to the fuel tank 112.

As discussed above, the fuel-enriched gas mixture 120 above the liquid fuel 116 inside the inner vessel 212 will contain a mixture of the inlet gas 118 that entered via gas inlet 216 and fuel vapor extracted from the liquid fuel 116 that entered via liquid inlet 218. In the illustrated embodiment, this fuel-enriched gas mixture 120 will flow upward past one or more baffles 250, through a flame arrestor 252, and then out of the evaporator 114 via the gas outlet 226. In exemplary embodiments, the gas outlet 226 is fluidly connected to the reactor supply conduit 140 of the inerting system 100 for being provided to the reactor 122.

As discussed above, in exemplary embodiments, each of the outer vessel 210 and inner vessel 212 is designed with a funnel shape and they are positioned relative to each other to enable productive liquid fuel and inlet gas interactions even when the evaporator 114 is tipped at an angle relative to the vertical position as shown. In addition, if the evaporator 114 is tipped on its side or upside down, then the liquid fuel 116 in the outer vessel 210 and fuel feed channel 232 will tend to collect in the plenum 214, and the liquid fuel 116 in the inner vessel 212 will be captured by the fuel baffles 250 instead of escaping out of the gas outlet 226 to the reactor 122. In this manner, the fuel baffles 250 are configured to restrict the liquid fuel 116 from exiting at the gas outlet 226.

The flame arrestor 252 may be configured with any suitable configuration, such as a disc or body with narrow axially elongated flow channels. The flow channels of the flame arrestor 252 may have a fluid flow area that is configured to enable passage of the fuel-enriched gas mixture 120 while also quenching a flame should one arise in the evaporator 114, thereby preventing such flame from traveling downstream to the reactor 122. In exemplary embodiments, the flame arrestor 252 is integrated into inner vessel 212, such as at the gas outlet 226.

In exemplary embodiments, a portion of the structure 224, or other suitable structure, may be included upstream of the inner vessel inlet 222 (as shown at 254, for example) and/or downstream of the liquid outlet 228 (as shown at 256, for example). The respective upstream structure portion 254 and downstream structure portion 256 may have the same configuration as the structure 224, or the structure in these respective portions 254 and/or 256 may be different. The upstream structure portion 254 may help in wicking the liquid fuel 116 into the inner vessel 212 and may help to prevent splashing inside of the plenum 214. The downstream structure portion 256 may serve as a coalescing filter where liquid fuel droplets can agglomerate and drain back into the liquid fuel 116 within the inner vessel 212, instead of through the gas outlet 226 toward the reactor 122. In addition, the configuration of the downstream structure portion 256 may have a porosity with a surface area that enables the downstream structure portion 256 to serve as a flame arrestor.

Figure 5:
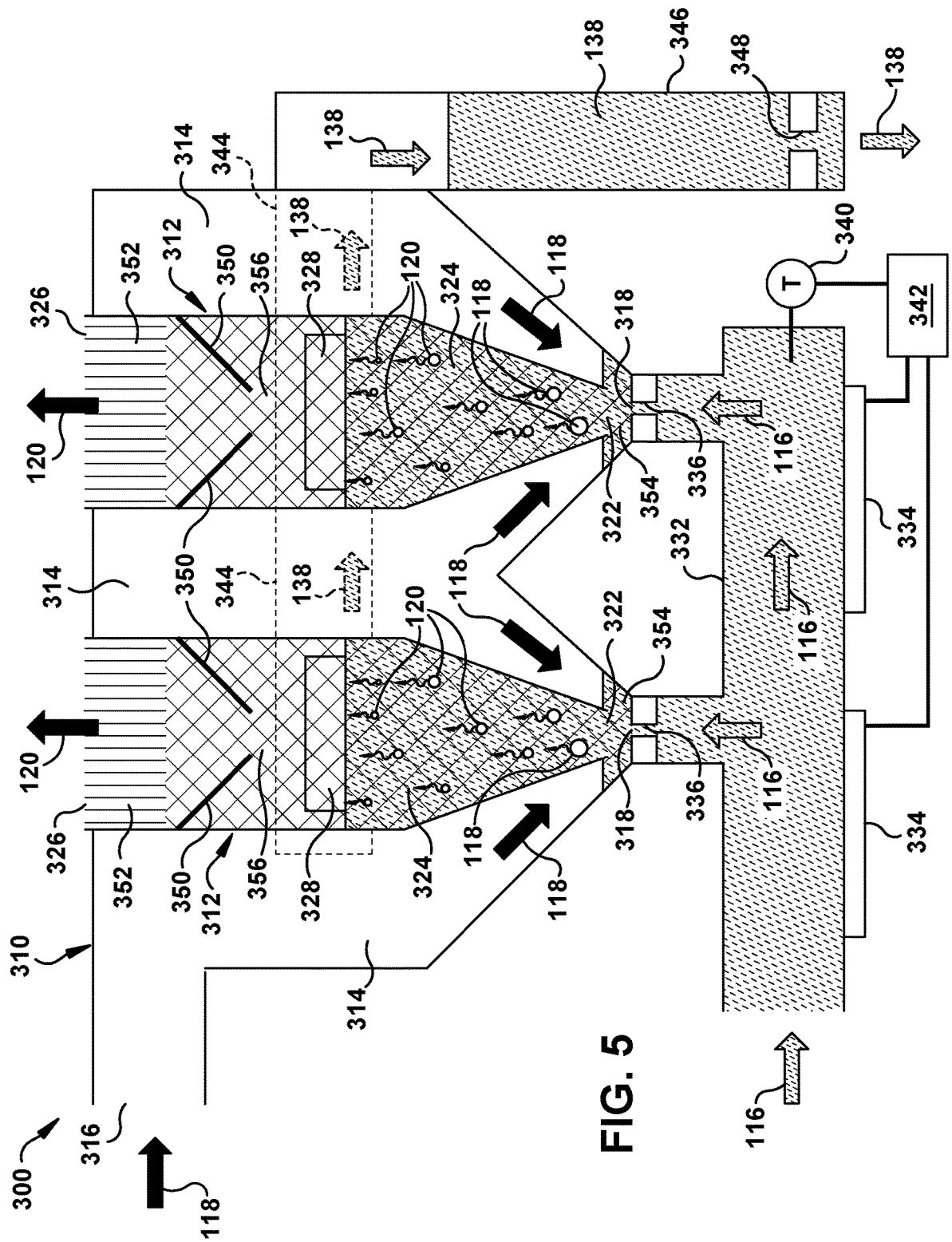
FIG. 5 is a schematic cross-sectional side view of another exemplary sparging evaporator according to an embodiment of the present disclosure that may be used in the inerting system in FIG. 3.

Turning now to FIG. 5, another exemplary embodiment of a sparging evaporator 300 is shown. The sparging evaporator 300 is substantially similar to the above-referenced sparging evaporator 114, and consequently the same reference numerals but in the 300-series are used to denote structures corresponding to similar structures in the sparging evaporators 114, 300. In addition, the foregoing description of the sparging evaporator 114 is equally applicable to the sparging evaporator 300, except as noted below. Similarly to the evaporator 114, the evaporator 300 may be utilized in an inerting system, such as the exemplary inerting system 100. Moreover, it is understood that aspects of the sparging evaporators 114, 300 may be substituted for one another or used in conjunction with one another where applicable.

As shown in the illustrated embodiment, the sparging evaporator 300 (also referred to as evaporator 300) effectively is two duplicate sparging evaporators 114 with one or more components combined. For example, in the illustrated embodiment, two outer vessels are combined in series into a single outer vessel 310 having a single plenum 314. In exemplary embodiments, only a single gas inlet 316 is provided into the single plenum 314. The evaporator 300 also may combine two fuel feed passages (e.g., channels or rails) into a single fuel feed channel 332 having two separate liquid inlets 318 into the plenum 314 of the outer vessel 310. Each liquid inlet 318 may have a metering orifice 336, as shown, and multiple heaters 334 may be provided for heating the fuel feed channel 332, or any other suitable structure as discussed above. One or more temperature sensors 340 may be provided for measuring temperature of the liquid fuel 116 in the fuel feed channel 332, or any other suitable location as discussed above. The heaters 334 and temperature sensor(s) 340 may be coupled to a controller 342 for controlling temperature. Alternatively, the heaters 334 may be passively controlled using a positive temperature coefficient (PTC) heater, for example.

As shown, the evaporator 300 includes two discrete inner vessels 312, and corresponding structures 324 within the inner vessels 312, for respectively forming two sources of the fuel-enriched gas mixture 120 that exit the evaporator 300 via respective gas outlets 326. In exemplary embodiments, the inner vessels 312 and/or the respective structures 324 may be the same as each other, or the inner vessels 312 and/or the respective structures 324 may be different. As described above in connection with the structure 224, the respective structures 324 are configured to promote liberation of the fuel vapor from the liquid fuel 116 within the inner vessels 312, and enable the inlet gas 118 in the liquid fuel 116 to interact with and sparge the fuel vapor in the liquid fuel 116, thereby forming the fuel-enriched gas mixture 120. The respective structures 324, or other suitable structures, may be included upstream of the respective inner vessel inlets 322 (as shown at 354, for example) and/or downstream of the respective liquid outlets 328 (as shown at 356, for example) in the same or similar manner as described above in connection with the evaporator 114. Also similarly to the evaporator 114, the evaporator 300 may include corresponding baffles 350 and flame arrestors 352 in each inner vessel 312. As shown, a single fuel outlet passage 344 is combined between the two inner vessels 312 to fluidly connect with the respective liquid outlets 328. The fuel outlet passage 344 drains the non-volatilized liquid fuel 138 into a single fuel discharge line 346. The fuel discharge line 346 may include a flow restriction orifice 348, such as a fixed restriction metering orifice, that meters the non-volatilized liquid fuel flow rate in a manner that maintains a non-zero liquid fuel head above the flow restriction orifice 348 in the same manner as described above.

In the illustrated embodiment, the outer vessel 310 is configured with an integrated dual-funnel shape, in which the liquid inlets 318 of the outer vessel 310 are arranged at respective bottom portions of the dual-funnel shape, and the respective inlets 322 of the inner vessels 312 are proximate the respective liquid inlets 318 of the outer vessel 310. Such a dual-funnel configuration with respective tapered surfaces 338 reduces the sensitivity of the evaporator 300 to changes in the relative angle between the free surface 220 and the inlet to the inner vessel 222 (such as from pitch or uncoordinated roll of the aircraft, for example) and better enables the liquid fuel 116 to be available near at least one of the inner vessel inlets 322 for pushing the liquid fuel 116 through the corresponding inner vessel 312 for volatilization of the fuel vapors. Such a dual-funnel configuration also enables better drainage of the liquid fuel 116 back into the fuel feed channel 332 to minimize fuel collection in the plenum 314. Such a parallel-combined evaporator 300 also effectively increases the aspect ratio of the device, which may reduce flow velocity to provide more even flow through and out of the device, which may aid in performance of the reactor 122. It is understood that although only two inner vessels 312 are shown in the illustrated embodiment, more than two inner vessels 312 (e.g., three, four, seven, ten or more) may be provided as may be desired for the particular application, as would be understood by those having ordinary skill in the art.

An exemplary inerting system 100 and/or sparging evaporator 114, 300 has been described herein. The sparging evaporator generally includes an outer vessel, an inner vessel within the outer vessel, and a plenum formed between the inner and outer vessels. The outer vessel includes a gas inlet for receiving inlet gas into the plenum, and a liquid inlet for receiving liquid fuel into the plenum. The inlet gas in the plenum generates a gas pressure that is exerted against a free surface of the liquid fuel in the plenum thereby forcing the liquid fuel and the inlet gas through an inlet of the inner vessel. The inner vessel contains a structure that promotes liberation of fuel vapor from the liquid fuel and enables the inlet gas in the liquid fuel to sparge the fuel vapor in the liquid fuel, thereby forming a fuel-enriched gas mixture that can be fed to a reactor of the inerting system.

Exemplary advantages of such an exemplary sparging evaporator 114, 300 may include, but are not limited to, one or more of the following, separately or in any combination: (i) maintain a safe but high-level fuel vapor at the inerting system's reactor inlet across the entire flight profile by simply controlling the evaporator's body temperature with a heat source; (ii) produce fuel vapors with a very small amount of heat since only a small amount of fuel is being continuously warmed up; (iii) avoid the need to actively control the fuel flow rate so long as a sufficient amount of fuel is continuously provided to the system; (iv) simultaneously evaporate fuel and mix with ullage air; (v) separate fuel vapor and liquid fuel by using inlet (e.g., ullage) gases to sweep fuel vapors against gravity and allows the liquid fuel to drain in direction of gravity; (vi) the evaporator can be oriented vertically or at an angle relative to vertical, so long as the unevaporated liquid fuel tends to drain into the tank; (vii) prevent liquid fuel from exiting the device into the downstream catalytic inerting system; (viii) prevent the fuel-enriched process gas mixture from short-circuiting back to the fuel tank without passing through the catalytic inerting system; (ix) separate most of the fuel contaminants from the fuel vapors that feed the catalytic reactor, which may result in longer reactor life.

In exemplary embodiments, the sparging evaporator 114, 300 may include, but is not limited to, one or more of the following exemplary features, separately or in any combination: (i) a suitable structure (such as a suitable mixing structure and/or heat-transfer structure), which may be a porous structure (e.g., a porous substrate, porous medium, porous bed, or the like), that is in intimate contact with both liquid fuel and inlet gas; (ii) the structure (e.g., porous structure) is heated and has a high surface area for heat transfer and mass transfer (evaporation), direct conductive path from heaters, promotes multi-phase mixing, provides a highly-uniform discharge stream in a compact distance, and/or prevents fuel splashing; (iii) an overall evaporator design that works across a range of aircraft attitudes due to inner vessel and outer vessel geometry (e.g., fuel funnel geometries and relative arrangement); (iv) integrated provisions to protect the catalytic inerting system, including baffles and catches for liquid fuel in case of a roll-over event and/or flame arrestor(s) to prevent a flame front from moving inside the device or discharging from the device; (v) architecture that returns unevaporated liquid fuel back to the fuel tank while preventing process gas mixture from short-circuiting back to the fuel tank; and (vi) architecture that provides an evenly mixed and uniform distribution of process gas flow to the catalytic reactor system.

According to an aspect of the present disclosure, a sparging evaporator includes: a gas stream inlet, a gas plenum and a fuel cone, through which gas flows; a liquid fuel inlet through which liquid fuel flows into the fuel cone, and a heater for heating the liquid fuel prior to its flow into the fuel cone; the fuel cone having a fuel cone inlet through which the liquid fuel is forced through and into the fuel cone by the pressure of the gas, wherein gas will bubble up through the liquid fuel in the mixing cone; a substrate inside the fuel cone which has a high heat transfer and high mass transfer for extracting fuel vapor from the liquid fuel, wherein a mixture of the fuel vapor and gas from the gas stream inlet exit through a process gas outlet where it is provided to an inerting system; a fuel window that allows liquid fuel to drain out of the fuel cone into a fuel gutter where it is collected and drained into a fuel outlet line.

Embodiments of the invention may include one or more of the following additional features separately or in any combination.

In some embodiments, the substrate is a high surface area porous substrate.

In some embodiments, the sparging evaporator further comprises a fuel outlet orifice that meters the liquid fuel rate to the fuel outlet line such that a non-zero fuel head is maintained above the fuel outlet orifice, thereby preventing the gas mixture above the liquid fuel from exiting through the fuel outlet.

In some embodiments, the sparging evaporator further comprises fuel baffles through which the mixture of fuel vapor and gas pass through prior to passing through the process gas outlet.

In some embodiments, the sparging evaporator further comprises a flame arrestor prior to the mixed gas outlet.

According to another aspect, a fuel sparging system comprises a plurality of fuel sparging evaporators according to any of the foregoing in parallel.

According to another aspect, a sparging evaporator includes: a vessel having a gas inlet for ingress of an inlet gas, a liquid inlet for ingress of a liquid fuel, and an outlet; a structure within the vessel having at least one fluid flow passage through which the inlet gas and the liquid fuel flow; wherein the structure is configured to promote liberation of fuel vapors from the liquid fuel, whereby the inlet gas sweeps away the fuel vapors to form a fuel-enriched gas mixture that is carried downstream and exits the vessel through the outlet.

In some embodiments, the liquid fuel forms a free surface in the vessel, and the inlet gas exerts a force against the free surface to force the liquid fuel through the at least one fluid flow passage of the structure.

In some embodiments, the vessel is an outer vessel, the sparging evaporator having an inner vessel within the outer vessel, and a plenum between the inner and outer vessel, wherein the structure is at least partially contained within the inner vessel and the liquid fuel forms a free surface in the plenum, whereby the inlet gas flows into the plenum to exert force on the free surface and push the liquid fuel through the inner vessel and the at least one fluid flow passage of the structure, and wherein the inlet gas bubbles up through the inner vessel and the at least one fluid flow passage of the structure to sweep away the fuel vapors.

According to another aspect, a sparging evaporator for a fuel tank inerting system includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet, a liquid outlet, and a gas outlet, wherein the inner vessel inlet is in fluid communication with the plenum; a heater in thermal communication with the liquid fuel, the heater being configured to heat and promote volatilization of at least a portion the liquid fuel to thereby form a volatilized fuel vapor; and a heat-transfer structure at least partially contained within the inner vessel, wherein the liquid fuel and the inlet gas flows through the heat-transfer structure when the evaporator is in use, the heat-transfer structure being in thermal communication with the heater and being configured to promote liberation of the volatilized fuel vapor from the liquid fuel; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet and through the heat-transfer structure, whereby the inlet gas in the liquid fuel sparges the volatilized fuel vapor in the liquid fuel to thereby form a fuel-enriched gas mixture containing the inlet gas and the volatilized fuel vapor, wherein the fuel-enriched gas mixture is carried downstream and exits the sparging evaporator via the gas outlet, and wherein non-volatilized liquid fuel exits the sparging evaporator via the liquid outlet.

According to another aspect, a sparging evaporator includes: a gas stream inlet, a gas plenum and a fuel funnel, through which gas flows; a liquid fuel inlet through which liquid fuel flows into the fuel funnel, and a heater for heating the liquid fuel; a mixing funnel within the fuel funnel, the mixing funnel having a mixing funnel inlet through which the liquid fuel is forced through and into the mixing funnel by the pressure of the gas, wherein gas will bubble up through the liquid fuel in the mixing funnel; a porous medium inside the fuel funnel that transfers heat and promotes mass transfer for liberating fuel vapor from the liquid fuel, wherein a mixture of the fuel vapor and gas from the gas stream inlet exit through a gas outlet as a fuel-enriched gas mixture where it is provided as a process gas to an inerting system; and a fuel window that allows liquid fuel to drain out of the mixing funnel into a fuel outlet passage where it is collected and drained into a fuel outlet line.

According to another aspect, a sparging evaporator includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet and a gas outlet, wherein the inner vessel inlet is in fluid communication with the plenum; and a structure at least partially contained within the inner vessel that is configured to interact with the liquid fuel and the inlet gas; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet to interact with the structure, the structure being configured to promote liberation of fuel vapor from the liquid fuel and enable the inlet gas in the liquid fuel to interact with and sweep away the fuel vapor to thereby form a fuel-enriched gas mixture containing the inlet gas and the fuel vapor, wherein the fuel-enriched gas mixture is carried downstream and exits the sparging evaporator via the gas outlet.

Embodiments may include one or more features of the foregoing aspects, separately or in any combination, which may be combined with one or more of the following additional features, which may be included separately or in any combination In some embodiments, the outer vessel is formed as an outer funnel having a wider outer funnel top portion and a narrower outer funnel bottom portion.

In some embodiments, the inner vessel is formed as an inner funnel having a wider inner funnel top portion and a narrower inner funnel bottom portion.

In some embodiments, the inner vessel inlet is formed at the narrower inner funnel bottom portion, the inner vessel being arranged within the outer vessel such that the inner vessel inlet is disposed in a region proximate the narrower outer funnel bottom portion.

In some embodiments, the gas inlet is located at an upper portion of the outer vessel, and wherein the liquid inlet is located at a bottom portion of the outer vessel.

In some embodiments, the heat-transfer structure is a porous medium.

In some embodiments, the porous medium forms a plurality of fluid flow paths across the heat-transfer structure.

In some embodiments, the porous medium has an interconnected porosity in a range from 50% open volume/total volume to 90% open volume/total volume.

In some embodiments, the porous medium has a porosity in a range from 58% open volume/total volume to 80% open volume/total volume.

In some embodiments, the heat-transfer structure extends between at least the inner vessel inlet and the liquid outlet; and/or the heat-transfer structure extends to a region upstream of the inner vessel inlet; and/or the heat-transfer structure extends to a region downstream of the liquid outlet.

In some embodiments, the heat-transfer structure is in thermal communication with the heater via an outer wall of the inner vessel and/or an outer wall of the outer vessel.

In some embodiments, the heater is controlled to change a temperature of the sparging evaporator in response to a change in altitude and/or atmospheric pressure during operation of the sparging evaporator.

In some embodiments, the heater is controlled to change a temperature of the sparging evaporator in response to a change in liquid fuel flow rate, liquid fuel temperature, inlet gas flow rate, inlet gas temperature, inlet gas volume, and/or inlet gas oxygen concentration.

In some embodiments, the sparging evaporator further includes one or more of: a fuel feed passage fluidly connected upstream of the liquid inlet for feeding the liquid fuel to the liquid inlet; and a metering orifice upstream of the liquid inlet for metering the liquid fuel into the plenum.

In some embodiments, the heater is coupled to the fuel feed passage to preheat the liquid fuel prior to entering the plenum through the liquid inlet.

In some embodiments, the sparging evaporator further includes: one or more baffles downstream of the liquid outlet and upstream of the gas outlet for restricting egress of the liquid fuel through the gas outlet.

In some embodiments, the sparging evaporator further includes: a flame arrestor at the gas outlet.

In some embodiments, the liquid outlet of the inner vessel is fluidly connected to a fuel outlet passage that is fluidly connected to a fuel discharge line for permitting discharge of the non-volatilized liquid fuel.

In some embodiments, the fuel discharge line includes a flow restriction orifice that meters the non-volatilized liquid fuel to maintain a non-zero liquid fuel head above the flow restriction orifice, thereby preventing the fuel-enriched gas mixture from exiting via the fuel discharge line.

In some embodiments, the structure is configured as a flow diffuser, a heat-transfer structure, and/or a static mixer.

In some embodiments, the sparging evaporator further includes: an energizer that cooperates with the mixing structure to further promote liberation of the fuel vapor from the liquid fuel.

In some embodiments, the energizer is a heater that is in thermal communication with the mixing structure.

In some embodiments, the evaporator contains a plurality of inner vessels within the outer vessel.

In some embodiments, the plurality of inner vessels are in parallel with each other.

According to another aspect, the sparging evaporator according to any of the foregoing is combined with a second sparging evaporator, wherein: the outer vessel of the sparging evaporator is integrated with a second outer vessel of the second sparging evaporator to form a single outer vessel of the combination, and such that the plenum forms a single plenum between the sparging evaporator and the second sparging evaporator.

In some embodiments, the combination further includes one or more of: a second inner vessel within the single outer vessel that is arranged within the single plenum, the second inner vessel having a second inner vessel inlet, a second liquid outlet, and a second gas outlet, wherein the second inner vessel inlet is in fluid communication with the single plenum; a second heat-transfer structure at least partially contained within the second inner vessel between the second inner vessel inlet and the second liquid outlet; a second liquid inlet for receiving the liquid fuel into the single plenum.

In some embodiments of the combination, the gas inlet is a single gas inlet of the combination that is in fluid communication with the single plenum.

In some embodiments of the combination, the liquid inlet and the second liquid inlet are fluidly connected via a single fuel feed passage.

In some embodiments of the combination, the liquid outlet and the second liquid outlet are fluidly connected via a single fuel outlet passage that is fluidly connected to a single fuel discharge line.

In some embodiments of the combination, the single outer vessel is configured as a dual-funnel shape having first and second lower narrow portions that are laterally spaced apart from each other.

In some embodiments of the combination, the inner vessel inlet is located proximate the first lower narrow portion of the single outer vessel, and wherein the second inner vessel inlet is located proximate the second lower narrow portion of the single outer vessel.

According to another aspect, an inerting system for a fuel tank includes: a fluid circuit fluidly connectable to the fuel tank; a reactor connected in the fluid circuit; and the sparging evaporator according to any of the foregoing that is connected in the fluid circuit upstream of the reactor; wherein the sparging evaporator is configured to receive a flow of the liquid fuel from the fuel tank, and wherein the evaporator is configured to receive at least a portion of flow of the inlet gas from ullage gas in the fuel tank; wherein the reactor is configured to convert at least a portion of the fuel-enriched gas mixture into an inert, non-flammable gas; and wherein the fluid circuit is configured to supply at least a portion of the inert, non-flammable gas to the fuel tank.

In some embodiments of the system, the fluid circuit further includes a liquid fuel return passage that is fluidly connected to the sparging evaporator for returning the non-volatilized liquid fuel to the fuel tank.

In some embodiments the system further comprises a pump connected in the fluid circuit, the pump being configured to pump the liquid fuel from the fuel tank to the liquid inlet of the sparging evaporator.

In some embodiments the system further comprises a blower connected in the fluid circuit, the blower being configured to move the inlet gas through the gas inlet of the sparging evaporator.

In some embodiments of the system, the reactor is a catalytic reactor that is configured to convert fuel vapor and oxygen contained in the fuel-enriched gas mixture into carbon dioxide and water vapor contained in the inert, non-flammable gas; optionally wherein the fuel-enriched gas mixture and the inert, non-flammable gas further contain nitrogen.

In some embodiments the system further comprises a heat exchanger connected in the fluid circuit downstream of the reactor, the heat exchanger being configured to cool inert, non-flammable gas exiting the reactor.

In some embodiments the system further comprises a condenser connected in the fluid circuit downstream of the reactor, the condenser being configured to condense at least one component of the inert, non-flammable gas into a liquid state.

In some embodiments the system further comprises the fuel tank.

In some embodiments the system further comprises the inerting system is a closed-loop ullage recirculating system.

According to another aspect, a method of fuel-vapor enrichment of a process gas stream for an inerting system, includes: feeding an inlet gas into a plenum of a sparging evaporator; feeding liquid fuel into the plenum; exerting the inlet gas against a free surface of the liquid fuel in the plenum to force the liquid fuel and the inlet gas into a vessel having a structure that interacts with the liquid fuel, thereby promoting fuel vapor to be liberated from the liquid fuel; sparging the fuel vapor with the inlet gas in the vessel to form a fuel-enriched gas mixture; and carrying the fuel-enriched gas mixture downstream through a gas outlet of the sparging evaporator.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operatively connection or coupling may include the entities being integral and unitary with each other, for example.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A sparging evaporator for a fuel tank inerting system, comprising:
    an outer vessel, an inner vessel within the outer vessel, and a plenum formed between the inner and outer vessels,
    the outer vessel having a gas inlet for receiving inlet gas, and a liquid inlet for receiving liquid fuel, wherein both the gas inlet and the liquid inlet are in fluid communication with the plenum;
    the inner vessel having an inner vessel inlet, a liquid outlet, and a gas outlet, wherein the inner vessel inlet is in fluid communication with the plenum;
    a heater in thermal communication with the liquid fuel, the heater being configured to heat and promote volatilization of at least a portion the liquid fuel to thereby form a volatilized fuel vapor;
    a heat-transfer structure at least partially contained within the inner vessel, wherein the liquid fuel and the inlet gas flows through the heat-transfer structure when the evaporator is in use, the heat-transfer structure being in thermal communication with the heater and being configured to promote liberation of the volatilized fuel vapor from the liquid fuel;
    wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet and through the heat-transfer structure, whereby the inlet gas in the liquid fuel sparges the volatilized fuel vapor in the liquid fuel to thereby form a fuel-enriched gas mixture containing the inlet gas and the volatilized fuel vapor, wherein the fuel-enriched gas mixture is carried downstream and exits the sparging evaporator via the gas outlet, and wherein non-volatilized liquid fuel exits the sparging evaporator via the liquid outlet.

2. The sparging evaporator according to claim 1,
    wherein the outer vessel is formed as an outer funnel having a wider outer funnel top portion and a narrower outer funnel bottom portion;
    wherein the inner vessel is formed as an inner funnel having a wider inner funnel top portion and a narrower inner funnel bottom portion; and
    wherein the inner vessel inlet is formed at the narrower inner funnel bottom portion, the inner vessel being arranged within the outer vessel such that the inner vessel inlet is disposed in a region proximate the narrower outer funnel bottom portion.

3. The sparging evaporator according to claim 2, wherein the gas inlet is located at an upper portion of the outer vessel, and wherein the liquid inlet is located at a bottom portion of the outer vessel.

4. The sparging evaporator according to claim 1, wherein the heat-transfer structure is a porous medium that forms a plurality of fluid flow paths across the heat-transfer structure.

5. The sparging evaporator according to claim 1, wherein the porous medium has an interconnected porosity in a range from 50% open volume/total volume to 90% open volume/total volume.

6. The sparging evaporator according to claim 1,
    wherein the heat-transfer structure extends between at least the inner vessel inlet and the liquid outlet; and/or
    wherein the heat-transfer structure extends to a region upstream of the inner vessel inlet; and/or
    wherein the heat-transfer structure extends to a region downstream of the liquid outlet.

7. The sparging evaporator according to claim 1, wherein the heat-transfer structure is in thermal communication with the heater via an outer wall of the inner vessel and/or an outer wall of the outer vessel.

8. The sparging evaporator according to claim 1,
    wherein the heater is controlled to change a temperature of the sparging evaporator in response to a change in altitude and/or atmospheric pressure during operation of the sparging evaporator;

alternatively or additionally, wherein the heater is controlled to change a temperature of the sparging evaporator in response to a change in liquid fuel flow rate, liquid fuel temperature, inlet gas flow rate, inlet gas temperature, inlet gas volume, and/or inlet gas oxygen concentration.

9. The sparging evaporator according to claim 1, further comprising:
a fuel feed passage fluidly connected upstream of the liquid inlet for feeding the liquid fuel to the liquid inlet; and
a metering orifice upstream of the liquid inlet for metering the liquid fuel into the plenum;
wherein the heater is coupled to the fuel feed passage to preheat the liquid fuel prior to entering the plenum through the liquid inlet.

10. The sparging evaporator according to claim 1, further comprising: one or more baffles downstream of the liquid outlet and upstream of the gas outlet for restricting egress of the liquid fuel through the gas outlet.

11. The sparging evaporator according to claim 1, further comprising: a flame arrestor at the gas outlet.

12. The sparging evaporator according to claim 1,
wherein the liquid outlet of the inner vessel is fluidly connected to a fuel outlet passage that is fluidly connected to a fuel discharge line for permitting discharge of the non-volatilized liquid fuel; and
wherein the fuel discharge line includes a flow restriction orifice that meters the non-volatilized liquid fuel to maintain a non-zero liquid fuel head above the flow restriction orifice, thereby preventing the fuel-enriched gas mixture from exiting via the fuel discharge line.

13. A combination of the sparging evaporator according to claim 1, with a second sparging evaporator, wherein:
the outer vessel of the sparging evaporator is integrated with a second outer vessel of the second sparging evaporator to form a single outer vessel of the combination, and such that the plenum forms a single plenum between the sparging evaporator and the second sparging evaporator;
wherein the combination further includes:
a second inner vessel within the single outer vessel that is arranged within the single plenum, the second inner vessel having a second inner vessel inlet, a second liquid outlet, and a second gas outlet, wherein the second inner vessel inlet is in fluid communication with the single plenum;
a second heat-transfer structure at least partially contained within the second inner vessel;
a second liquid inlet for receiving the liquid fuel into the single plenum;
wherein the gas inlet is a single gas inlet of the combination that is in fluid communication with the single plenum;
wherein the liquid inlet and the second liquid inlet are fluidly connected via a single fuel feed passage; and
wherein the liquid outlet and the second liquid outlet are fluidly connected via a single fuel outlet passage that is fluidly connected to a single fuel discharge line.

14. The combination according to claim 13,
wherein the single outer vessel is configured as a dual-funnel shape having first and second lower narrow portions that are laterally spaced apart from each other;
wherein the inner vessel inlet is located proximate the first lower narrow portion of the single outer vessel, and wherein the second inner vessel inlet is located proximate the second lower narrow portion of the single outer vessel.

15. An inerting system for a fuel tank, the inerting system comprising:
a fluid circuit fluidly connectable to the fuel tank;
a reactor connected in the fluid circuit; and
the sparging evaporator according to claim 1, that is connected in the fluid circuit upstream of the reactor;
wherein the sparging evaporator is configured to receive a flow of the liquid fuel from the fuel tank, and wherein the evaporator is configured to receive at least a portion of flow of the inlet gas from ullage gas in the fuel tank;
wherein the reactor is configured to convert at least a portion of the fuel-enriched gas mixture into an inert, non-flammable gas; and
wherein the fluid circuit is configured to supply at least a portion of the inert, non-flammable gas to the fuel tank.

16. The inerting system according to claim 15, wherein the fluid circuit further includes a liquid fuel return passage that is fluidly connected to the sparging evaporator for returning the non-volatilized liquid fuel to the fuel tank.

17. The inerting system according to claim 15, further comprising a pump connected in the fluid circuit, the pump being configured to pump the liquid fuel from the fuel tank to the liquid inlet of the sparging evaporator.

18. The inerting system according to claim 15, further comprising a blower connected in the fluid circuit, the blower being configured to move the inlet gas through the gas inlet of the sparging evaporator.

19. The inerting system according to claim 15, wherein the reactor is a catalytic reactor that is configured to convert fuel vapor and oxygen contained in the fuel-enriched gas mixture into carbon dioxide and water vapor contained in the inert, non-flammable gas; optionally wherein the fuel-enriched gas mixture and the inert, non-flammable gas further contain nitrogen.

20. The inerting system according to claim 15, further comprising a heat exchanger connected in the fluid circuit downstream of the reactor, the heat exchanger being configured to cool inert, non-flammable gas exiting the reactor.

21. The inerting system according to claim 15, further comprising a condenser connected in the fluid circuit downstream of the reactor, the condenser being configured to condense at least one component of the inert, non-flammable gas into a liquid state.

22. The inerting system according to claim 15, further comprising the fuel tank.

23. The inerting system according to claim 15, wherein the inerting system is a closed-loop ullage recirculating system.

24. The inerting system according to claim 15, wherein the evaporator contains a plurality of inner vessels within the outer vessel.

25. A sparging evaporator comprising:
a gas stream inlet, a gas plenum and a fuel funnel, through which gas flows;
a liquid fuel inlet through which liquid fuel flows into the fuel funnel, and a heater for heating the liquid fuel;
a mixing funnel within the fuel funnel, the mixing funnel having a mixing funnel inlet through which the liquid fuel is forced through and into the mixing funnel by the pressure of the gas, wherein gas will bubble up through the liquid fuel in the mixing funnel;
a porous medium inside the fuel funnel that transfers heat and promotes mass transfer for liberating fuel vapor from the liquid fuel, wherein a mixture of the fuel vapor and gas from the gas stream inlet exit through a gas outlet as a fuel-enriched gas mixture where it is provided as a process gas to an inerting system; and a fuel window that allows liquid fuel to drain out of the mixing funnel into a fuel outlet passage where it is collected and drained into a fuel outlet line.

26. The sparging evaporator according to claim 25, wherein the porous medium has a porosity in a range from 58% open volume/total volume to 80% open volume/total volume.

27. A sparging evaporator, comprising:
an outer vessel, an inner vessel within the outer vessel, and a plenum formed between the inner and outer vessels,
the outer vessel having a gas inlet for receiving inlet gas, and a liquid inlet for receiving liquid fuel, wherein both the gas inlet and the liquid inlet are in fluid communication with the plenum;
the inner vessel having an inner vessel inlet and a gas outlet, wherein the inner vessel inlet is in fluid communication with the plenum; and
a structure at least partially contained within the inner vessel that is configured to interact with the liquid fuel and the inlet gas;
wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet to interact with the structure, the structure being configured to promote liberation of fuel vapor from the liquid fuel and enable the inlet gas in the liquid fuel to interact with and sweep away the fuel vapor to thereby form a fuel-enriched gas mixture containing the inlet gas and the fuel vapor, wherein the fuel-enriched gas mixture is carried downstream and exits the sparging evaporator via the gas outlet.

28. The sparging evaporator according to claim 27, wherein the structure is configured as a flow diffuser, a heat-transfer structure, and/or a static mixer.

29. The sparging evaporator according to claim 27, further comprising a energizer that cooperates with the structure to further promote liberation of the fuel vapor from the liquid fuel.

30. The sparging evaporator according to claim 27, wherein the energizer is a heater that is in thermal communication with the structure.

31. A sparging evaporator comprising:
a vessel having a gas inlet for ingress of an inlet gas, a liquid inlet for ingress of a liquid fuel, and an outlet;
a structure within the vessel having at least one fluid flow passage through which the inlet gas and the liquid fuel flow;
wherein the structure is configured to promote liberation of fuel vapors from the liquid fuel, whereby the inlet gas sweeps away the fuel vapors to form a fuel-enriched gas mixture that is carried downstream and exits the vessel through the outlet, and
wherein the vessel is an outer vessel, the sparging evaporator having an inner vessel within the outer vessel, and a plenum between the inner and outer vessel, wherein the structure is at least partially contained within the inner vessel and the liquid fuel forms a free surface in the plenum, whereby the inlet gas flows into the plenum to exert force on the free surface and push the liquid fuel through the inner vessel and the at least one fluid flow passage of the structure, and wherein the inlet gas bubbles up through the inner vessel and the at least one fluid flow passage of the structure to sweep away the fuel vapors.

32. A method of fuel-vapor enrichment of a process gas stream for an inerting system, comprising:
feeding an inlet gas into a plenum of a sparging evaporator;
feeding liquid fuel into the plenum;
exerting the inlet gas against a free surface of the liquid fuel in the plenum to force the liquid fuel and the inlet gas into a vessel having a structure that interacts with the liquid fuel, thereby promoting fuel vapor to be liberated from the liquid fuel;
sparging the fuel vapor with the inlet gas in the vessel to form a fuel-enriched gas mixture; and
carrying the fuel-enriched gas mixture downstream through a gas outlet of the sparging evaporator.

* * * * *